(12) United States Patent
Moon et al.

(10) Patent No.: US 10,775,670 B2
(45) Date of Patent: Sep. 15, 2020

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Chang-Yul Moon, Paju-si (KR); Ji-Su Yoon, Paju-si (KR); Kyu-Hwan Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/146,376

(22) Filed: Sep. 28, 2018

(65) Prior Publication Data
US 2019/0129253 A1 May 2, 2019

(30) Foreign Application Priority Data
Oct. 31, 2017 (KR) .................. 10-2017-0144065

(51) Int. Cl.
| | |
|---|---|
| G09G 3/36 | (2006.01) |
| G02F 1/13357 | (2006.01) |
| G02F 1/1333 | (2006.01) |
| F21V 8/00 | (2006.01) |
| G02F 1/1335 | (2006.01) |

(52) U.S. Cl.
CPC ....... *G02F 1/133615* (2013.01); *G02B 6/005* (2013.01); *G02B 6/0073* (2013.01); *G02F 1/133308* (2013.01); *G02F 1/133512* (2013.01); *G02F 1/133514* (2013.01); *G02F 1/133603* (2013.01); *G02F 1/133606* (2013.01); *G02B 6/0043* (2013.01); *G02B 6/0053* (2013.01)

(58) Field of Classification Search
CPC . G02B 6/005; G02B 6/0025; G02F 1/133617; G02F 1/1368; G02F 1/133514; G02F 1/133615; G02F 2001/133317; G09G 3/2003; G09G 3/3406; G09G 3/3607
USPC .............................. 345/87, 88, 102
See application file for complete search history.

(56) References Cited

U.S. PATENT DOCUMENTS

| | | |
|---|---|---|
| 2003/0214720 A1 | 11/2003 | Bourdelais et al. |
| 2009/0059121 A1 | 3/2009 | Konno et al. |
| 2011/0026124 A1 | 2/2011 | Kim et al. |
| 2012/0127697 A1 | 5/2012 | Kim et al. |
| 2012/0147295 A1 | 6/2012 | Kasano et al. |
| 2012/0147296 A1 | 6/2012 | Montgomery et al. |
| 2013/0003415 A1* | 1/2013 | Park .................. G02B 6/0043 362/627 |
| 2015/0062490 A1 | 3/2015 | Kwon |
| 2015/0103151 A1 | 4/2015 | Carls et al. |
| 2015/0109814 A1 | 4/2015 | Chen et al. |

(Continued)

FOREIGN PATENT DOCUMENTS

| | | |
|---|---|---|
| CN | 106200112 A | 12/2016 |
| EP | 3 457 201 A1 | 3/2019 |

(Continued)

*Primary Examiner* — Jennifer T Nguyen
(74) *Attorney, Agent, or Firm* — Seed IP Law Group LLP

(57) ABSTRACT

The present disclosure is directed to a liquid crystal display device including a display panel having a red pixel, a green pixel, and a blue pixel; and a backlight unit configured to emit light to the display panel. The backlight unit includes a light source which outputs a first color light; a color conversion layer configured to convert the first color light into a second color light such that red light and green light are spatially separated; and an optical sheet which diffuses or condenses the second color light.

15 Claims, 10 Drawing Sheets

(56) References Cited

U.S. PATENT DOCUMENTS

| | | |
|---|---|---|
| 2015/0124188 A1 | 5/2015 | Kadowaki et al. |
| 2015/0260903 A1 | 9/2015 | Kashima et al. |
| 2015/0323728 A1 | 11/2015 | Lee et al. |
| 2016/0025921 A1 | 1/2016 | Park |
| 2016/0043288 A1 | 2/2016 | Chen et al. |
| 2016/0070137 A1 | 3/2016 | You et al. |
| 2016/0085109 A1 | 3/2016 | Baek et al. |
| 2016/0201858 A1 | 7/2016 | Kang et al. |
| 2016/0291231 A1* | 10/2016 | Jang ............... G09G 3/2003 |
| 2016/0334564 A1 | 11/2016 | Cho et al. |
| 2016/0377786 A1 | 12/2016 | Ham |
| 2017/0139100 A1* | 5/2017 | Nam ................ G02B 6/005 |
| 2017/0146859 A1 | 5/2017 | Lin et al. |
| 2017/0153366 A1* | 6/2017 | Park ................. G02B 5/204 |
| 2017/0168351 A1 | 6/2017 | Qiu et al. |
| 2018/0017726 A1 | 1/2018 | Kim et al. |
| 2018/0039131 A1 | 2/2018 | Szwarcman et al. |
| 2018/0081105 A1* | 3/2018 | Harada ............. G02B 6/009 |
| 2019/0004375 A1* | 1/2019 | Chang .............. G02B 6/005 |
| 2019/0086608 A1 | 3/2019 | Yoo et al. |
| 2019/0094617 A1 | 3/2019 | Park et al. |
| 2019/0129253 A1 | 5/2019 | Moon et al. |
| 2019/0129254 A1 | 5/2019 | Moon et al. |
| 2020/0026124 A1 | 1/2020 | Kurogane et al. |

FOREIGN PATENT DOCUMENTS

| | | |
|---|---|---|
| TW | 200739192 A | 10/2007 |
| TW | I503812 B | 10/2015 |
| TW | 201614342 A | 4/2016 |
| TW | I574430 B | 3/2017 |
| TW | I591071 B | 7/2017 |
| TW | 201736915 A | 10/2017 |
| TW | I642773 B | 12/2018 |

\* cited by examiner

BACKLIGHT UNIT AND LIQUID CRYSTAL DISPLAY DEVICE INCLUDING THE SAME

CROSS-REFERENCE TO RELATED APPLICATIONS

This application claims the benefit under 35 U.S.C. § 119(a) of Korean Patent Application No. 2017-0144065, filed on Oct. 31, 2017, in the Korean Intellectual Property Office, which is incorporated herein by reference in its entirety.

BACKGROUND

Technical Field

The present disclosure relates to a backlight unit and a liquid crystal display device including the same.

Description of the Related Art

As an information-oriented society has developed, a variety of needs with respect to a display device for displaying an image have increased. Accordingly, recently, several flat panel display devices, such as a liquid crystal display (LCD) device, a plasma display panel (PDP), an organic electroluminescence display device, have been utilized. Among flat panel display devices, an LCD device displays an image by modulating light, which is incident from a backlight unit, by controlling an electric field applied to a liquid crystal layer.

In such LCDs, backlight units may be classified into a direct light type backlight unit and an edge light type backlight unit depending on an arrangement of light sources. In the direct light type backlight unit, a plurality of light sources are arranged on a rear surface of an LCD panel and light emitted by the light sources is transmitted toward the LCD panel. On the other hand, in the edge light type backlight unit, a plurality of light sources are arranged on one side of a bottom of an LCD panel and light emitted by the light sources is transmitted toward the LCD panel by using a light guide plate.

For the light sources of the direct light type or edge light type backlight unit, white light in which blue light, red light, and green light are mixed, is emitted toward the rear surface of the LCD panel or a side of the light guide plate. Here, the green light is generated by absorbing, by a green fluorescent material, the blue light, and the red light is generated by absorbing, by a red fluorescent material, the blue light.

Referring to FIG. 1, it may be seen that a part of a green light emitting area overlaps a red color absorption area. Due to such properties, since the red fluorescent material absorbs the green light as much as an area R in which the green light emitting area overlaps the red color absorption area, the green light is reduced. Accordingly, luminance of light is reduced.

BRIEF SUMMARY

Embodiments relate to a backlight unit capable of improving luminance of light and a liquid crystal display device including the backlight unit.

One or more embodiments relate to a liquid crystal display device including: a display panel which comprises a red pixel, a green pixel, and a blue pixel; and a backlight unit which emits light to the display panel, wherein the backlight unit includes: a light source which outputs a first color light; a color conversion layer which is disposed on the light source and converts the first color light into a second color light; an optical sheet which diffuses or condenses the second color light; and an air gap formed between the color conversion layer and the optical sheet.

One or more embodiments relate to a backlight unit including: a light source which outputs a first color light; a color conversion layer which is disposed on the light source and converts the first color light into a second color light; an optical sheet which diffuses or condenses the second color light; and an air gap formed between the color conversion layer and the optical sheet, wherein the first color light comprises blue light, and the second color light includes green light.

Advantages and features of the disclosure will be set forth in part in the description which follows and in part will become apparent to those having ordinary skill in the art upon examination of the following or may be learned from practice of the disclosure. Other advantages and features of the embodiments herein may be realized and attained by the structure particularly pointed out in the written description and claims hereof as well as the appended drawings.

It is to be understood that both the foregoing general description and the following detailed description are explanatory and are intended to provide further explanation of the embodiments as claimed.

BRIEF DESCRIPTION OF THE SEVERAL VIEWS OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION

Figure 1:
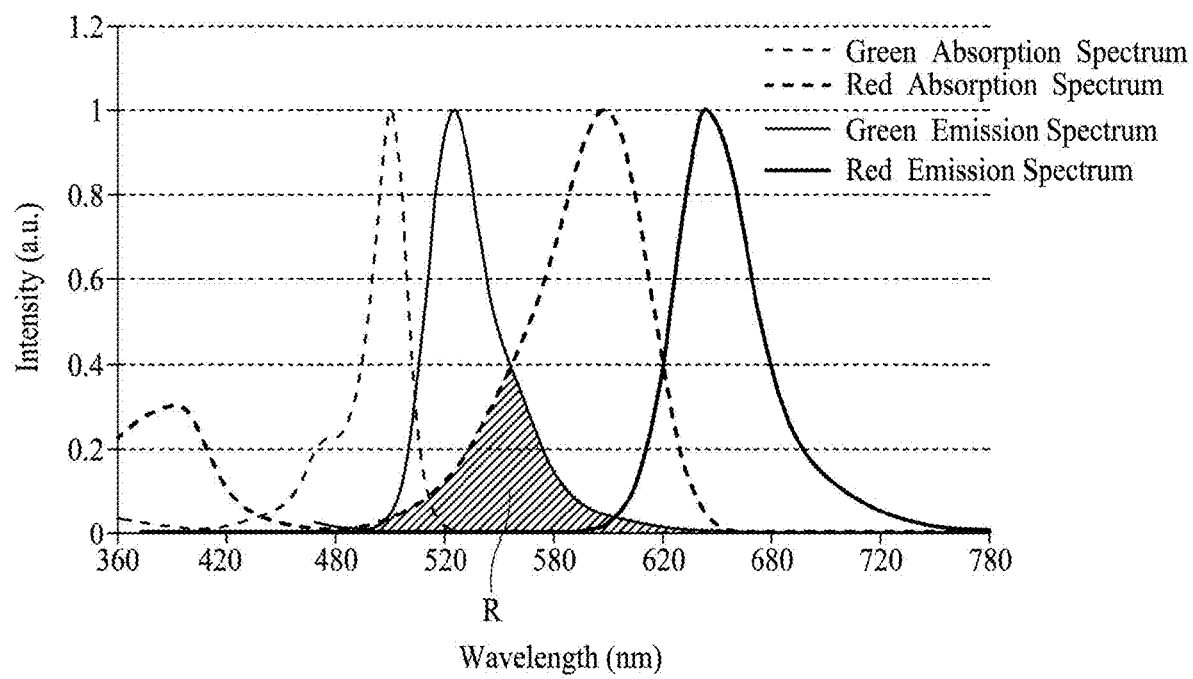
FIG. 1 is a graph illustrating absorption spectrums and luminescence spectrums with respect to red and green.

Hereinafter, embodiments of the present disclosure will be described in detail with reference to the attached drawings.

Advantages and features of the present disclosure and a method of achieving the same will become apparent with reference to the attached drawings and embodiments described below in detail. However, the present disclosure is not limited to the embodiments described below and may be embodied with a variety of different modifications. The embodiments are merely provided to allow one of ordinary skill in the art to completely understand the scope of the present disclosure.

Shapes, sizes, ratios, angles, numbers, and the like shown in the drawings to explain the embodiments of the present disclosure are merely examples, and the present disclosure is not limited to the shown in the drawings. Throughout the specification, like reference numerals refer to like elements. In the description of the embodiments of the present disclosure, a detailed description of a well-known technology of the related art will be omitted when it is deemed to obscure the essence of the present disclosure.

When "comprise," "have," "include," and the like are stated herein, another parts may be added unless "only" is used. Singular expressions of components, unless particularly defined otherwise, include plural expressions thereof.

When a component is interpreted, an error range is included without an additional explicit statement thereof.

In a description on a position relationship, when a position relationship between two parts is described as, for example, "on," "above," "below," "beside," and the like, one or more other parts may be located between the two parts unless "just" or "directly" is used.

In a description on a time relationship, when a temporal order relationship is described as, for example, "after," "next to," "and then," "before," and the like, discontinuous cases may also be included unless "just" or "directly" is used.

Terms such as first, second, and the like are used for describing a variety of components. However, the components will not be limited by the terms. The terms are used merely for distinguishing one component from others. Accordingly, a first component stated below may be a second component within the technical concept of the present disclosure.

A relationship among "x-axis direction," "y-axis direction," and "z-axis direction" should not be interpreted as a vertically formed geometrical relationship and may mean having directionality wider than a functionally operable range of a component in the present disclosure.

The term "at least one" should be understood as including all combinations of one or more related items. For example, "at least one of a first item, a second item, and a third item" may mean not only each of the first item, the second item, and the third item but also any combinations of all items from two or more of the first item, the second item, and the third item.

Features of a variety of embodiments of the present disclosure may be partially or entirely combined or mixed with one another and may perform technically diverse interconnection and drive, and the embodiments may be independently performed from one another or may be performed together in a correlation.

Hereinafter, exemplary embodiments of the present disclosure will be described in detail with reference to the attached drawings.

Figure 2:
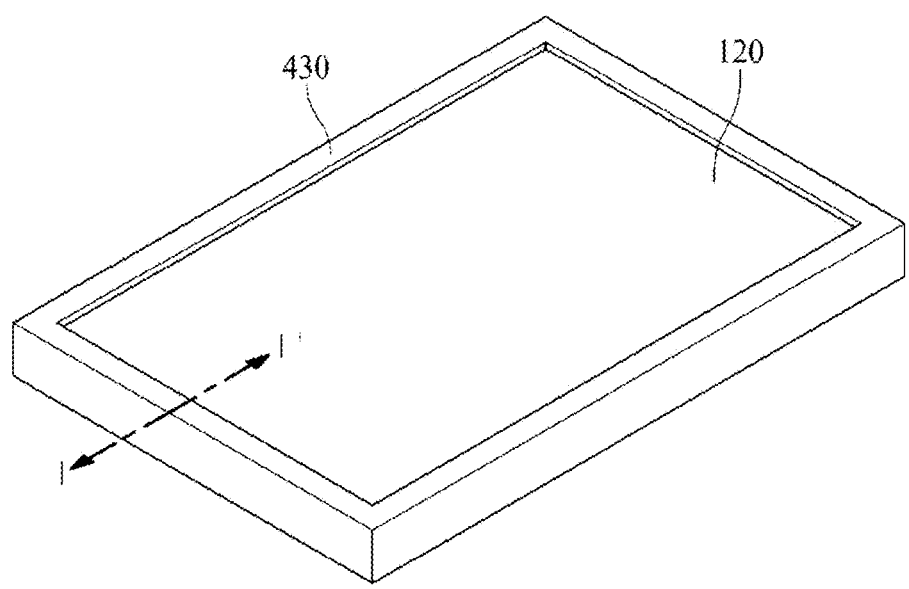
FIG. 2 is a perspective view of a liquid crystal display device according to one embodiment of the present disclosure.
Figure 3:
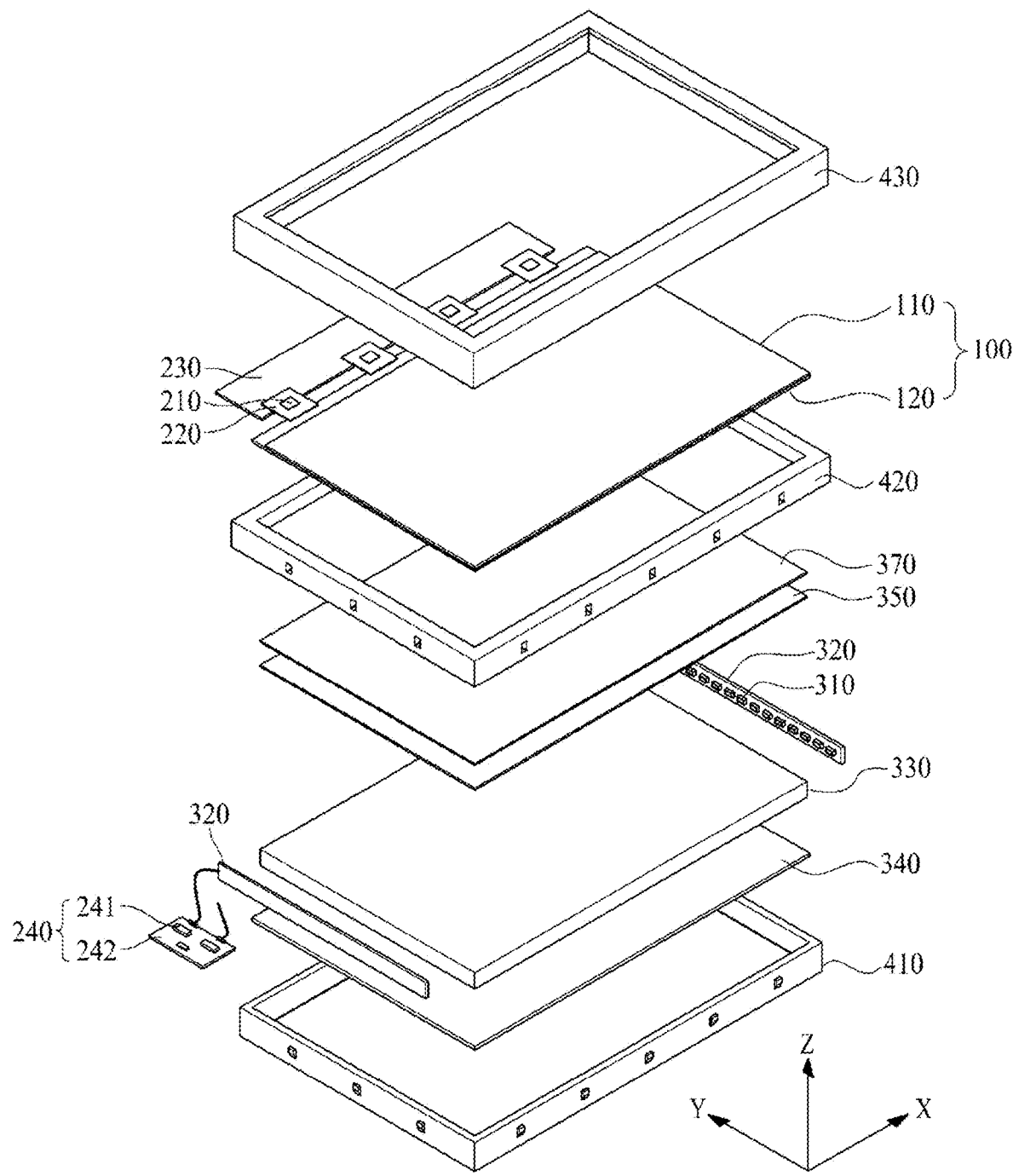
FIG. 3 is an exploded perspective view of the liquid crystal display device of FIG. 2.
Figure 4:
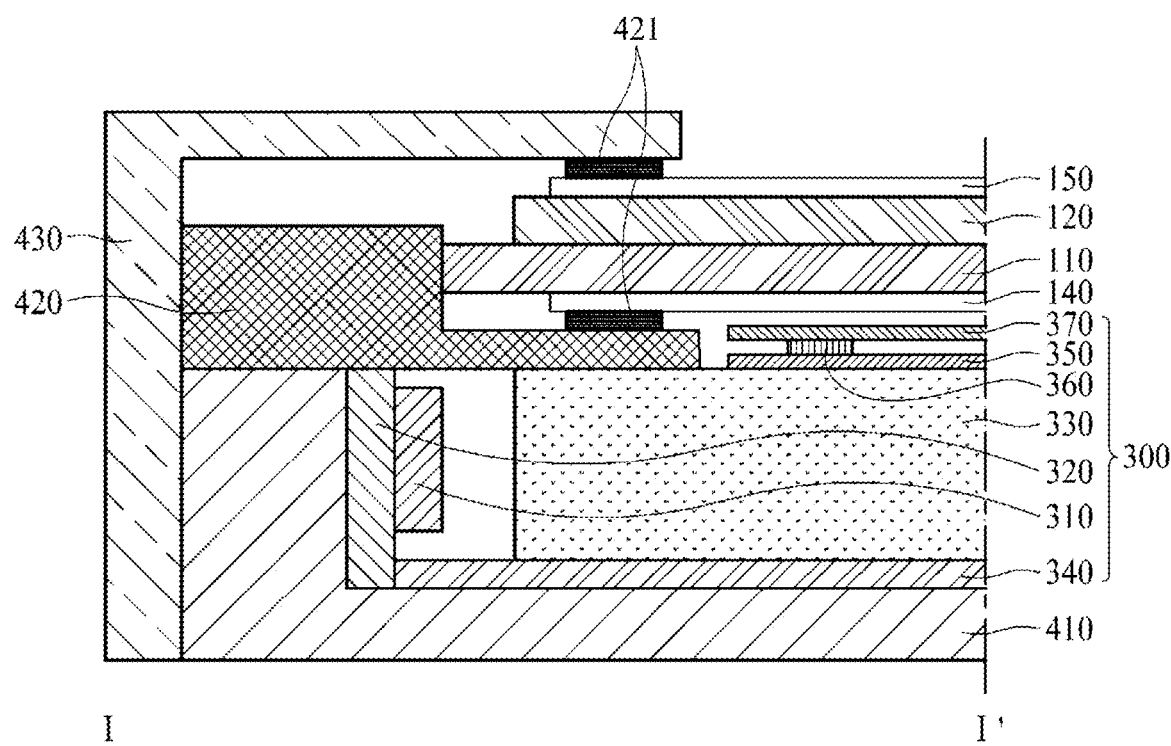
FIG. 4 is a cross-sectional view taken along a line I-I' in FIG. 2.

FIG. 2 is a perspective view of a liquid crystal display device according to one embodiment of the present disclosure. FIG. 3 is an exploded perspective view of the liquid crystal display device of FIG. 2. FIG. 4 is a cross-sectional view taken along a line I-I' in FIG. 2.

Referring to FIGS. 2 to 4, the liquid crystal display device according to one embodiment of the present disclosure includes a display panel 100, a drive circuit portion for driving the display panel 100, a backlight unit 300, and a case member.

The display panel 100 includes a lower substrate 110, an upper substrate 120, and a liquid crystal layer interposed between the lower substrate 110 and the upper substrate 120. The lower substrate 110 and the upper substrate 120 may be formed of glass or plastic.

The lower substrate 110 may have a size larger than a size of the upper substrate 120.

Accordingly, flexible source films 220 may be attached to an edge of one side of a top surface of the lower substrate 110 which is not covered by the upper substrate 120. The top surface of the lower substrate 110 corresponds to a surface which faces the upper substrate 120.

Signal lines and pixels are provided on the top surface of the lower substrate 110 of the display panel 100. The signal lines may include data lines and gate lines which overlap one another, a common line for supplying a common voltage to common electrodes, and gate control signal lines through which gate control signals are supplied as control signals to a gate drive circuit. Pixels may be arranged in an intersection or overlap area between the data lines and the gate lines. Each of the pixels includes a thin film transistor (TFT), a pixel electrode, and the common electrode. The TFT supplies a data voltage of the data line to the pixel electrode in response to receiving a gate signal of the gate line.

Liquid crystals of the liquid crystal layer are driven by an electric field generated by a potential difference between the data voltage supplied to the pixel electrode and the common voltage supplied to the common electrode such that a transmission amount of light incident from the backlight unit may be adjusted.

A black matrix and a color filter may be provided on a bottom surface of the upper substrate 120 of the display panel 100. The bottom surface of the upper substrate 120 corresponds to a surface which faces the lower substrate 110. However, when the display panel 100 is formed using a color filter on TFT array (COT), the black matrix and the color filter may be provided on the top surface of the lower substrate 110.

The common electrode may be provided on the bottom surface of the upper substrate 120 in a perpendicular electric field drive method, such as a twisted nematic (TN) mode and a vertical alignment (VA) mode, or may be provided on the top surface of the lower substrate 110 in a horizontal electric field drive method, such as an in-plane switching (IPS) mode and a fringe field switching (FFS) mode.

The black matrix includes a light-barrier material formed in a matrix structure so as to prevent light from leaking into areas except a pixel area.

The color filter is formed in the pixel area between the black matrixes. The color filter includes a red color filter, a green color filter, and a blue color filter.

An upper polarizing plate 150 is attached to the upper substrate 120 of the display panel 100, and a lower polarizing plate 140 is attached to the lower substrate 110. A light transmission axis of the upper polarizing plate 150 intersects with or crosses a light transmission axis of the lower polarizing plate 140. Also, an alignment film for setting a pre-tilt angle of liquid crystals may be formed on inner sides of the upper substrate 120 and the lower substrate 110 which are in contact with the liquid crystals.

The drive circuit portion includes the gate drive circuit, source drive circuits 210, the flexible source films 220, a circuit board 230, and a light source drive portion 240.

The gate drive circuit supplies the gate signals to the gate lines of the lower substrate 110. The gate drive circuit may be formed directly on the top surface of the lower substrate 110 by using a gate driver in panel (GIP) method. Otherwise, when the gate drive circuit is embodied as a drive chip, the gate driving circuit may be mounted on a flexible gate film by using a chip on film (COF) method, and the flexible gate films may be attached to the edge of the top surface of the lower substrate 110 which is not covered by the upper substrate 120.

The source drive circuits 210 supply the data voltages to the data lines of the lower substrate 110. When each of the source drive circuits 210 is embodied as a drive chip, each of the source drive circuits 210 may be mounted on the flexible source film 220 by using a COF method. Otherwise, the source drive circuits 210 may be adhered to the top surface of the lower substrate 110 by using a chip on glass (COG) method or a chip on plastic (COP) method. The flexible source films 220 may be attached to the edge of the one side of the top surface of the lower substrate 110 which is not covered by the upper substrate 120 and the circuit board 230. The circuit board 230 may be embodied as a printed circuit board (PCB).

The light source drive portion 240 includes a light source drive circuit 241 and a light source circuit board 242.

The light source drive circuit 241 supplies drive currents to light sources 310 to allow the light sources 310 to emit light. The light source drive circuit 241 may be mounted on the light source circuit board 242. Otherwise, the light source drive circuit 241 may be mounted on the circuit board 230. In this case, the light source circuit board 242 may be omitted.

The drive circuit portion may further include a timing control circuit and a control circuit board on which the timing control circuit is mounted. In this case, the control circuit board may be connected to the circuit board 230 through a certain flexible cable.

The backlight unit 300 includes a plurality of such light sources 310, a light source circuit board 320, a light guide plate 330, a reflection sheet 340, optical sheets 370, and the like. The backlight unit 300 converts light from the light sources 310 into a uniform surface light source through the light guide plate 330 and the optical sheets 370 and emits light toward the display panel 100. Although the backlight unit is described with reference to FIGS. 3 and 4 as being embodied as an edge light type, it should be noted that the backlight unit is not limited thereto and may be embodied as a direct light type.

The light sources 310 may be embodied as light emitting diodes (LEDs). Here, the LEDs may include at least one of a blue LED which outputs blue light, a red LED which outputs red light, and a magenta LED which outputs magenta light, in which blue light and red light are mixed.

The light sources 310 are arranged on at least one side surface of the light guide plate 330 and emit light toward the side surface of the light guide plate 330. The light sources 310 are mounted on the light source circuit board 320 and turned on or off by receiving drive currents of the light source drive circuit 241. The light source circuit board 320 is connected to the light source drive portion 240.

The light guide plate 330 converts light from the light sources 310 into a surface light source and emits light toward the display panel 100. The reflection sheet 340 is disposed on a bottom surface of the light guide plate 330 and reflects light, which moves from the light guide plate 330 toward the bottom of the light guide plate 330, toward the light guide plate 330.

An optical sheet 370 is disposed between the light guide plate 330 and the display panel 100. That is, the optical sheet 370 is disposed below the display panel 100, and the light guide plate 330 is disposed below the optical sheets 370. The optical sheet 370 includes one or more prism sheets or one or more diffusion sheets, diffuses light incident from the light guide plate 330, and refracts a progression path of light to allow the light to be incident on a light-incident surface of the display panel 100 at a substantially vertical angle. Also, the optical sheet 370 may include a dual brightness enhancement film (DBEF). For example, the optical sheets 370 may include a diffusion sheet, a prism sheet, and a DBEF. In this case, an uppermost optical sheet of the optical sheets 370 may be a DBEF.

A color conversion layer 350 is disposed on the light guide plate 330 and converts blue light or magenta light incident from the light sources 310 through the light guide plate 330 into white light. The color conversion layer 350 according to the embodiment may also include a green color conversion layer which converts blue light or magenta light into green light.

An adhesive layer 360 is disposed between the color conversion layer 350 and the optical sheet 370. The adhesive layer 360 allows the color conversion layer 350 and the optical sheet 370 to adhere to each other and forms an air gap between the color conversion layer 350 and the optical sheet 370. A detailed description of the color conversion layer 350 and the adhesive layer 360 will be described below with reference to FIGS. 5 to 11.

The case member includes a bottom cover 410, a support frame 420, and a top case 430.

The bottom cover 410 is manufactured as a square metal frame and surrounds a side surface and a bottom surface of the backlight unit 300 as shown in FIG. 4. The bottom cover 410 may be manufactured using a high strength steel plate, for example, an electro galvanized iron (EGI) plate, a steel use stainless (SUS) plate, a galvarium (SGLC) steel sheet, an aluminum-plated steel sheet (ALCOSTA), a tin-plated steel sheet (SPTE), and the like.

The support frame 420 supports a bottom surface of the lower substrate 110 of the display panel 100. The support frame 420 is sometimes referred to as a guide panel, a guide frame, or the like. The support frame 420 may be fixedly combined with the bottom cover 410 by using a fixing member. The support frame 420 may be manufactured as a square frame formed of glass fibers mixed in a synthetic resin such as polycarbonate and the like, or may be manufactured using an SUS plate. In addition, a buffering member 421 may be provided between the lower substrate 110 and the support frame 420 as shown in FIG. 4 to protect the lower substrate 110 of the display panel 100 from being shocked by the support frame 420.

The top case 430 surrounds edges of the display panel 100, a top surface and a side surface of the support frame 420, and side surfaces of the bottom cover 410. The top case 430 may be manufactured using, for example, an EGI plate, an SUS plate, or the like. The top case 430 may be fixed to the support frame 420 by using, for example, a hook or a screw. In addition, the buffering member 421 may be provided between the upper substrate 120 and the top case 430 as shown in FIG. 4 to protect the upper substrate 120 of the display panel 100 from being shocked by the top case 430.

First Embodiment

Figure 5:
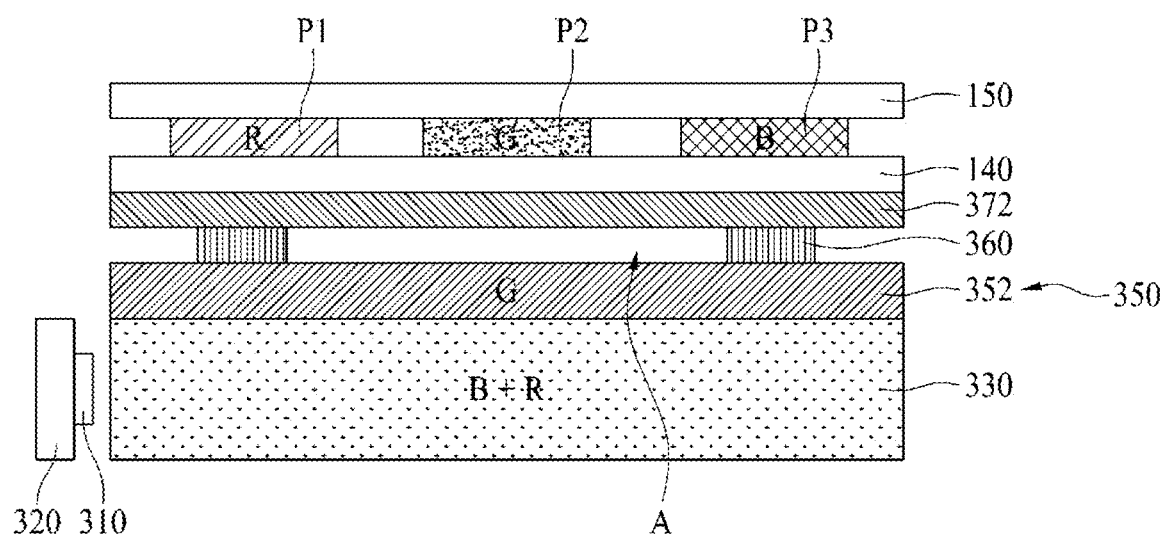
FIG. 5 is a schematic cross-sectional view showing a color conversion layer and an adhesive layer according to a first embodiment of the present disclosure.

FIG. 5 is a schematic cross-sectional view illustrating a first embodiment of the color conversion layer and the adhesive layer.

Referring to FIG. 5, a liquid crystal display device includes the display panel 100 and the backlight unit 300.

The backlight unit 300 includes the light sources 310, the light guide plate 330, a green color conversion layer 352, the adhesive layer 360, and a prism sheet 372.

The light sources 310 may include a blue LED which emits blue light and a red LED which emits red light or may include a magenta LED which emits magenta light, in which blue light and red light are mixed. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the first embodiment of the present disclosure, on the light guide plate 330, blue light may be incident from the blue LED, and red light may be incident from the red LED. Here, the blue light and the red light may be mixed in the light guide plate 330 to become the magenta light. In addition, on the light guide plate 330, magenta light may be incident from the magenta LED.

Accordingly, the light guide plate 330 allows the magenta light to proceed toward the display panel 100. The green color conversion layer 352 is formed on the light guide plate 330 to overlap a plurality of pixels P1, P2, and P3. The green color conversion layer 352 is disposed on a path of light which proceeds toward the display panel 100 from the light guide plate 330 and converts the magenta light emitted by the light guide plate 330 into white light. In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light and green light which have passed through the green color conversion layer 352 are mixed with each other and converted into white light.

The above-described green light emitting material includes, for example, a green phosphorescent material or a green fluorescent material and is mixed with a transparent resin material, such as a silicone resin, to form the green color conversion layer 352. The prism sheet 372 condenses light, which is incident thereon, in a first direction. Here, the first direction may correspond to a major axis direction or a minor axis direction of the light guide plate 330.

The adhesive layer 360 is disposed between the green color conversion layer 352 and the prism sheet 372. The adhesive layer 360 is formed on a portion of a top surface of the green color conversion layer 352 so as to allow the prism sheet 372 to adhere to the green color conversion layer 352 simultaneously while forming an air gap A between the green color conversion layer 352 and the prism sheet 372. Here, the adhesive layer 360 is formed so as to not overlap a green (G) pixel P2 such that green light generated by the green color conversion layer 352 proceeds toward the G pixel P2 without luminance reduction. That is, the adhesive layer 360 is formed to overlap a red (R) pixel P1 and a blue (B) pixel P3 as shown in FIG. 5.

The display panel 100 includes the lower polarizing plate 140, the upper polarizing plate 150, and a plurality of such pixels P1, P2, and P3.

The lower polarizing plate 140 is disposed at the bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

The red color filter includes red color which transmits light having a red wavelength and absorbs light having other wavelengths. The green color filter includes green color which transmits light having a green wavelength and absorbs light having other wavelengths. The blue color filter includes blue color which transmits light having a blue wavelength and absorbs light having other wavelengths.

Accordingly, in the R pixel P1, as the white light generated by the green color conversion layer 352 passes through the red color filter, blue light and green light are absorbed and red light is emitted. In the G pixel P2, as the white light generated by the green color conversion layer 352 passes through the green color filter, blue light and red light are absorbed and green light is emitted. In the B pixel P3, as the white light generated by the green color conversion layer 352 passes through the blue color filter, red light and green light are absorbed and blue light is emitted.

Figure 12:
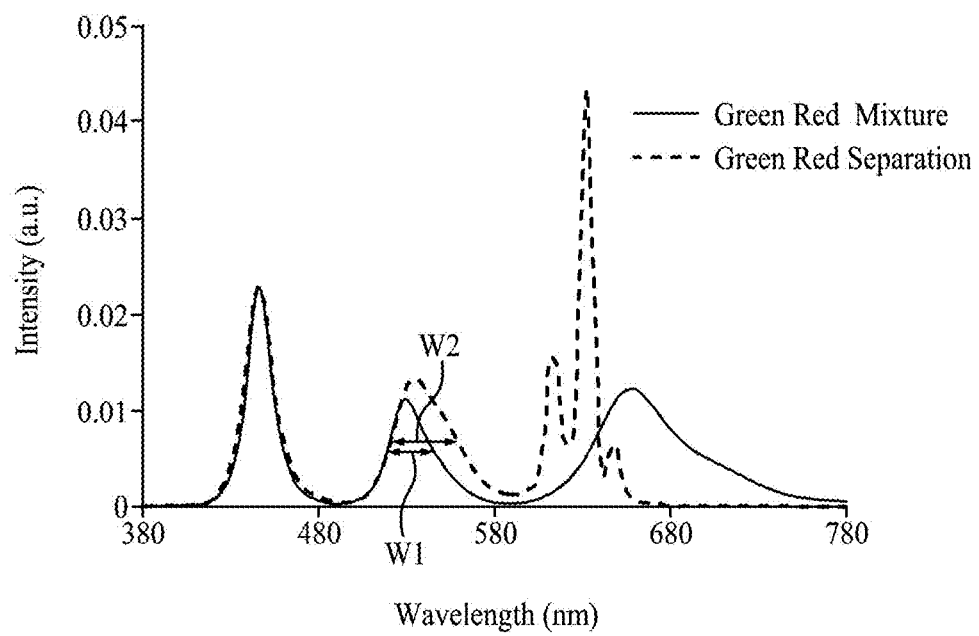
FIG. 12 is a graph illustrating an increase in luminance of a configuration in which red light and green light are spatially separated.

In the liquid crystal display device according to the first embodiment of the present disclosure, blue light and red light are emitted by the light sources 310 and green light is generated by the green color conversion layer 352. That is, since red light and green light are spatially separated and the red light is generated first followed by generation of the green light, the liquid crystal display device prevents a red light emitting material from absorbing the green light. Accordingly, in the liquid crystal display device according to the first embodiment of the present disclosure, the green light increases and a half width of a green peak increases, as shown in FIG. 12, such that luminance of light may be expected to increase.

Also, the liquid crystal display device according to the first embodiment of the present disclosure may prevent a light-condensing function of the prism sheet 372 from being degraded due to a scattering property caused by the green light emitting material of the green color conversion layer 352 by forming the air gap A between the green color conversion layer 352 and the prism sheet 372. This structure will be described below in detail with reference to FIGS. 13A to 15.

In addition, although it is assumed in FIG. 5 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a green color conversion layer.

Second Embodiment

Figure 6:
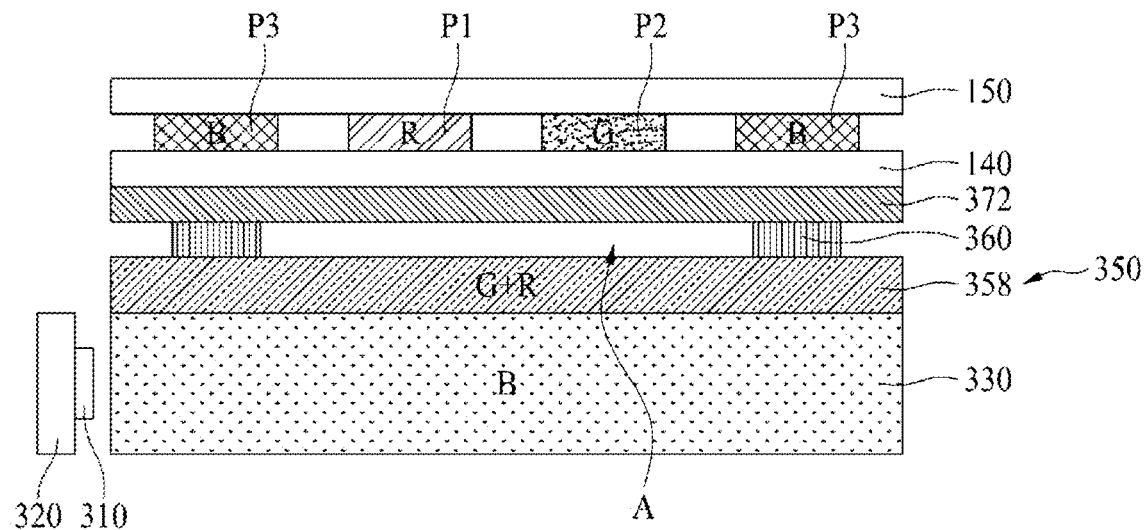
FIG. 6 is a schematic cross-sectional view showing a color conversion layer and an adhesive layer according to a second embodiment of the present disclosure.

FIG. 6 is a schematic cross-sectional view illustrating a second embodiment of the color conversion layer and the adhesive layer.

Referring to FIG. 6, a liquid crystal display device includes the display panel 100 and the backlight unit 300.

The backlight unit 300 includes the light sources 310, the light guide plate 330, a mixed color conversion layer 358, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the second embodiment of the present disclosure, on the light guide plate 330, blue light may be incident from the blue LED. Accordingly, the light guide plate 330 allows the blue light to proceed toward the display panel 100.

The mixed color conversion layer 358 is formed on the light guide plate 330 to overlap a plurality of pixels P1, P2, and P3. The mixed color conversion layer 358 is disposed on a path of light which proceeds toward the display panel 100 from the light guide plate 330 and converts the blue light emitted by the light guide plate 330 into white light. In more detail, the mixed color conversion layer 358 includes a red light emitting material and a green light emitting material. The red light emitting material included in the mixed color conversion layer 358 collides with a part of the blue light and absorbs energy of the blue light. Accordingly, a wavelength of the part of the blue light is changed into that of the red light. Also, the green light emitting material included in the mixed color conversion layer 358 collides with a part of the blue light and absorbs energy of the blue light. Accordingly, a wavelength of the part of the blue light is changed into that of the green light. When the light passing through the mixed color conversion layer 358 is mixed, the blue light, the red light, and the green light are mixed and converted into white light.

The above-described red light emitting material includes, for example, a red phosphorescent material or a red fluorescent material and is mixed with a transparent resin material, such as a silicone resin, to form the mixed color conversion layer 358. The above-described green light emitting material includes, for example, a green phosphorescent material or a green fluorescent material and is mixed with a transparent resin material, such as a silicone resin, to form the mixed color conversion layer 358. The prism sheet 372 condenses white light which is incident in a first direction.

Here, the first direction may correspond to a major axis direction or a minor axis direction of the light guide plate 330.

The adhesive layer 360 is disposed between the mixed color conversion layer 358 and the prism sheet 372. The adhesive layer 360 is formed on a portion of a top surface of the mixed color conversion layer 358 so as to allow the prism sheet 372 to adhere to the mixed color conversion layer 358 simultaneously while forming an air gap A between the mixed color conversion layer 358 and the prism sheet 372.

Here, the adhesive layer 360 is formed to not overlap a red pixel P1 and a green pixel P2 such that the red light and the green light generated by the mixed color conversion layer 358 may proceed to the red pixel P1 and the green pixel P2 without luminance reduction.

That is, the adhesive layer 360 is formed to overlap the B pixel P3 as shown in FIG. 6.

The display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the white light generated by the mixed color conversion layer 358 passes through the red color filter, blue light and green light are absorbed and red light is emitted. In the G pixel P2, as the white light generated by the mixed color conversion layer 358 passes through the green color filter, blue light and red light are absorbed and green light is emitted. In the B pixel P3, as the white light generated by the mixed color conversion layer 358 passes through the blue color filter, red light and green light are absorbed and blue light is emitted.

The liquid crystal display device according to the second embodiment of the present disclosure may prevent a light-condensing function of the prism sheet 372 from being degraded due to a scattering property caused by the red light emitting material and the green light emitting material of the mixed color conversion layer 358 by forming the air gap A between the mixed color conversion layer 358 and the prism sheet 372.

In addition, although it is assumed in FIG. 6 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a mixed color conversion layer.

Third Embodiment

Figure 7:
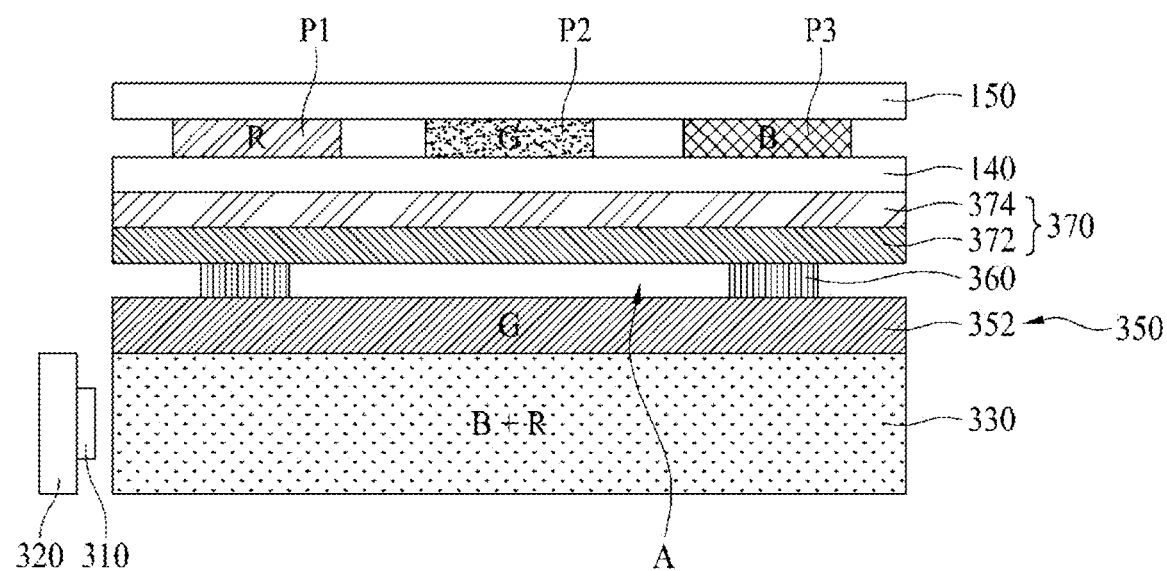
FIG. 7 is a schematic cross-sectional showing a color conversion layer and an adhesive layer according to a third embodiment of the present disclosure.

FIG. 7 is a schematic cross-sectional view illustrating a third embodiment of the color conversion layer and the adhesive layer. In FIG. 7, the liquid crystal display device shown in FIG. 5 may further include a diffusion sheet 374.

The diffusion sheet 374 is disposed on the prism sheet 372 and diffuses light which is incident thereon.

Since other components are substantially similar to those of FIG. 5, a description thereof will be omitted.

Fourth Embodiment

Figure 8:
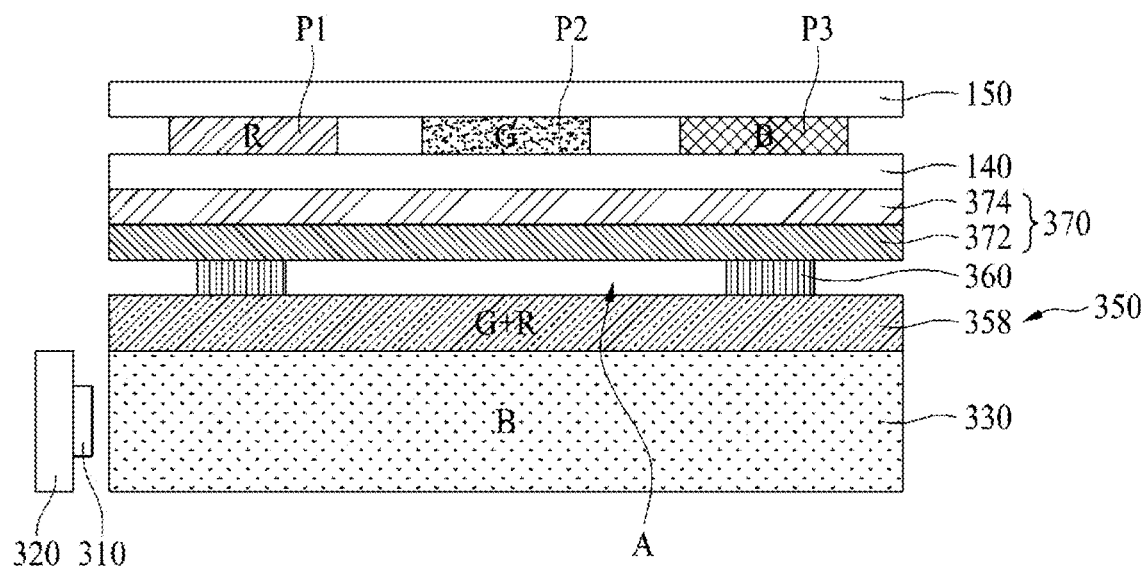
FIG. 8 is a schematic cross-sectional view showing a color conversion layer and an adhesive layer according to a fourth embodiment of the present disclosure.

FIG. 8 is a schematic cross-sectional view illustrating a fourth embodiment of the color conversion layer and the adhesive layer. In FIG. 8, the liquid crystal display device shown in FIG. 6 may further include the diffusion sheet 374. The diffusion sheet 374 is disposed on the prism sheet 372 and diffuses light which is incident thereon.

Since other components are substantially similar to those of FIG. 6, a description thereof will be omitted.

Fifth Embodiment

Figure 9:
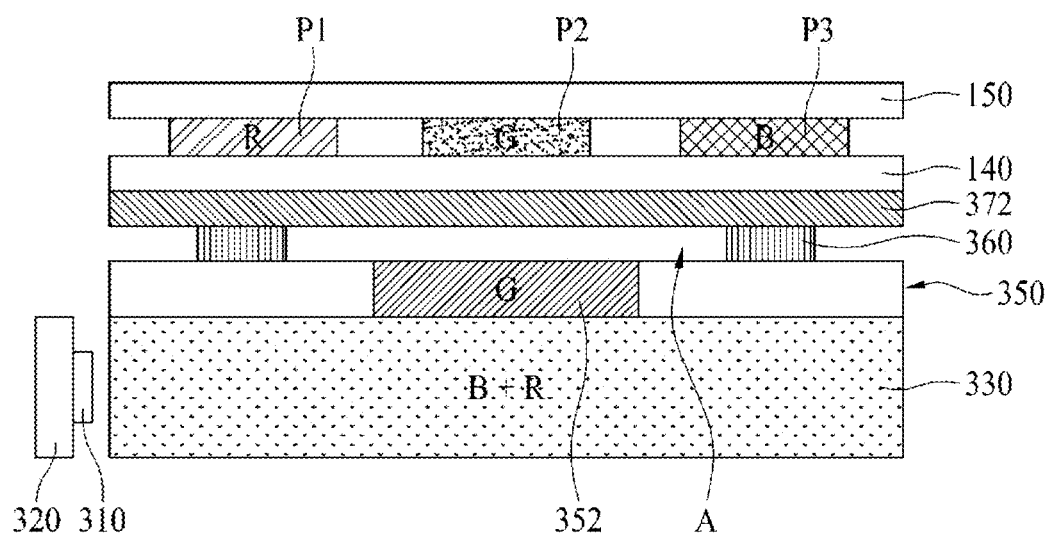
FIG. 9 is a schematic cross-sectional view illustrating a fifth embodiment of the color conversion layer and the adhesive layer.

FIG. 9 is a schematic cross-sectional view illustrating a fifth embodiment of the color conversion layer and the adhesive layer.

Referring to FIG. 9, a liquid crystal display device includes the display panel 100 and the backlight unit 300.

The backlight unit 300 includes the light sources 310, the light guide plate 330, the green color conversion layer 352, the adhesive layer 360, and the prism sheet 372.

The light sources 310 may include a blue LED which emits blue light and a red LED which emits red light or may include a magenta LED which emits magenta light, in which blue light and red light are mixed. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the fifth embodiment of the present disclosure, on the light guide plate 330, blue light may be incident from the blue LED, and red light may be incident from the red LED. Here, the blue light and the red light may be mixed in the light guide plate 330 to become the magenta light. In addition, on the light guide plate 330, magenta light may be incident from the magenta LED. Accordingly, the light guide plate 330 allows the magenta light to proceed toward the display panel 100.

The color conversion layer 350 is disposed between the light guide plate 330 and the display panel 100 and includes the green color conversion layer 352. The green color conversion layer 352 is formed on the light guide plate 330 to overlap the G pixel P2. The green color conversion layer 352 is disposed on a path of light which proceeds toward the display panel 100 from the light guide plate 330 and converts the magenta light emitted by the light guide plate 330 into white light. In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light and green light which have passed through the green color conversion layer 352 are mixed with each other and converted into white light.

The above-described green light emitting material includes, for example, a green phosphorescent material or a green fluorescent material and is mixed with a transparent resin material, such as a silicone resin, to form the green color conversion layer 352. The prism sheet 372 condenses light, which is incident thereon, in a first direction. Here, the first direction may correspond to a major axis direction or a minor axis direction of the light guide plate 330.

The adhesive layer 360 is disposed between the green color conversion layer 352 and the prism sheet 372. The adhesive layer 360 is formed on a portion of a top surface of the green color conversion layer 352 so as to allow the prism sheet 372 to adhere to the green color conversion layer 352 simultaneously while forming an air gap A between the green color conversion layer 352 and the prism sheet 372. Here, the adhesive layer 360 is formed to not overlap a G pixel P2 such that green light generated by the green color conversion layer 352 proceeds toward the G pixel P2 without luminance reduction. That is, the adhesive layer 360 is formed to overlap an R pixel P1 and a B pixel P3 as shown in FIG. 9.

The display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, when the magenta light which is incident from the light guide plate 330 passes through the red color filter, the blue light is absorbed and the red light is emitted. In the G pixel P2, as the white light generated by the green color conversion layer 352 passes through the green color filter, the blue light and red light are absorbed and the green light is emitted. In the B pixel P3, when the magenta light which is incident from the light guide plate 330 passes through the blue color filter, the red light is absorbed and the blue light is emitted.

In addition, although it is assumed in FIG. 9 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a green color conversion layer.

Sixth Embodiment

Figure 10:
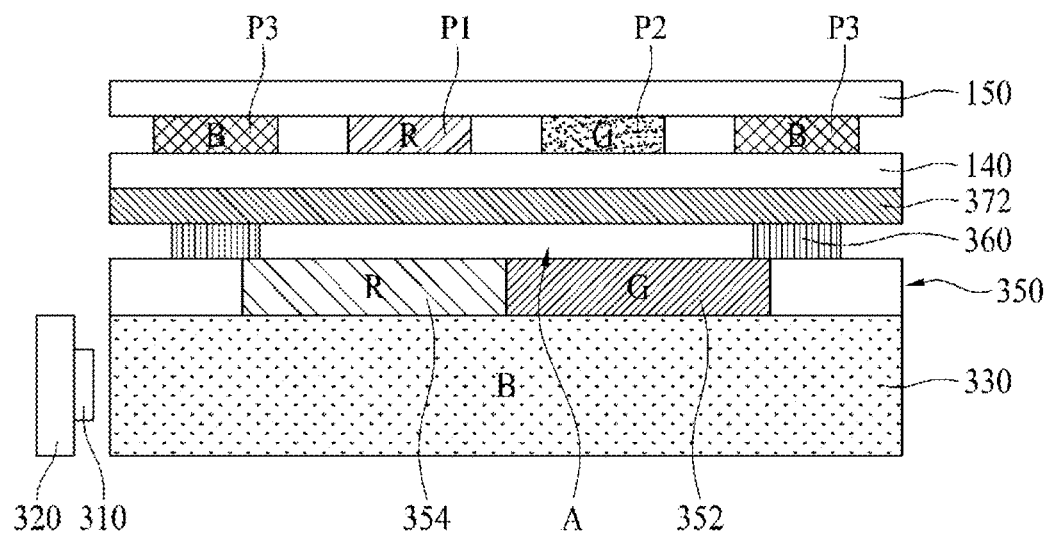
FIG. 10 is a schematic cross-sectional view showing a color conversion layer and an adhesive layer according to a sixth embodiment of the present disclosure.

FIG. 10 is a schematic cross-sectional view illustrating a sixth embodiment of the color conversion layer and the adhesive layer.

Referring to FIG. 10, a liquid crystal display device includes the display panel 100 and the backlight unit 300.

The backlight unit 300 includes the light sources 310, the light guide plate 330, the color conversion layer 350, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the sixth embodiment of the present disclosure, on the light guide plate 330, the blue light may be incident from the blue LED. Accordingly, the light guide plate 330 allows the blue light to proceed toward the display panel 100.

The color conversion layer 350 is disposed between the light guide plate 330 and the display panel 100 and includes a red color conversion layer 354 and the green color conversion layer 352.

The red color conversion layer 354 is formed on the light guide plate 330 to overlap an R pixel P1. The red color conversion layer 354 is disposed on a path of light which proceeds toward the display panel 100 from the light guide plate 330 and converts the blue light emitted by the light guide plate 330 into magenta light. In more detail, the red color conversion layer 354 includes a red light emitting material. The red light emitting material included in the red color conversion layer 354 collides with a part of the blue light and absorbs energy of the blue light. Accordingly, a wavelength of the part of the blue light is changed into that of the red light, and blue light and red light which have passed through the red color conversion layer 354 are mixed with each other and converted into magenta light.

The above-described red light emitting material, for example, includes a red phosphorescent material or a red fluorescent material and is mixed with a transparent resin material, such as a silicone resin, to form the red color conversion layer 354.

The green color conversion layer 352 is formed on the light guide plate 330 to overlap the G pixel P2. The green color conversion layer 352 is disposed on a path of light which proceeds toward the display panel 100 from the light guide plate 330 and converts the blue light emitted by the light guide plate 330 into cyan light. In more detail, the green color conversion layer 352 includes a green light emitting material. The green light emitting material included in the green color conversion layer 352 collides with a part of the blue light and absorbs energy of the blue light. Accordingly, a wavelength of the part of the blue light is changed into that of green light, and blue light and green light which have passed through the green color conversion layer 352 are mixed with each other and converted into cyan light.

The above-described green light emitting material includes, for example, a green phosphorescent material or a green fluorescent material and is mixed with a transparent resin material, such as a silicone resin, to form the green color conversion layer 352.

The prism sheet 372 condenses white light, which is incident thereon, in a first direction. Here, the first direction may correspond to a major axis direction or a minor axis direction of the light guide plate 330.

The adhesive layer 360 is disposed between the color conversion layer 350 and the prism sheet 372. The adhesive layer 360 is formed on a portion of of a top surface of the color conversion layer 350 so as to allow the prism sheet 372 to adhere to the color conversion layer 350 simultaneously while forming an air gap A between the color conversion layer 350 and the prism sheet 372. Here, the adhesive layer 360 is formed to not overlap a G pixel P2 such that the green light generated by the green color conversion layer 352 proceeds toward the G pixel P2 without luminance reduction. Here, the adhesive layer 360 is formed to not overlap an R pixel P1 such that the red light generated by the red color conversion layer 354 proceeds toward the R pixel P1 without luminance reduction. That is, the adhesive layer 360 is formed to overlap a B pixel P3 as shown in FIG. 10.

The display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect each other or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, when the magenta light generated by the red color conversion layer 354 passes through the red color filter, blue light is absorbed and red light is emitted. In the G pixel P2, when the cyan light generated by the green color conversion layer 352 passes through the green color filter, the blue light is absorbed and the green light is emitted. In the B pixel P3, the blue light which is incident from the light guide plate 330 passes through the blue color filter as it is and is emitted.

In the liquid crystal display device according to the sixth embodiment of the present disclosure, the light sources 310 emit blue light. Red light is generated by the red color conversion layer 354, and green light is generated by the green color conversion layer 352. That is, since red light and green light are spatially separated, the liquid crystal display device prevents the red light emitting material from absorbing the green light. Accordingly, in the liquid crystal display device according to the sixth embodiment of the present disclosure, the green light increases and a half width of a green peak increases, as shown in FIG. 12, such that luminance of light may be expected to increase.

Also, the liquid crystal display device according to the sixth embodiment of the present disclosure may prevent a light-condensing function of the prism sheet 372 from being degraded due to a scattering property caused by the green light emitting material or the red light emitting material of the color conversion layer 350 by forming the air gap A between the color conversion layer 350 and the prism sheet 372.

In addition, although it is assumed in FIG. 10 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a color conversion layer.

Seventh Embodiment

Figure 11:
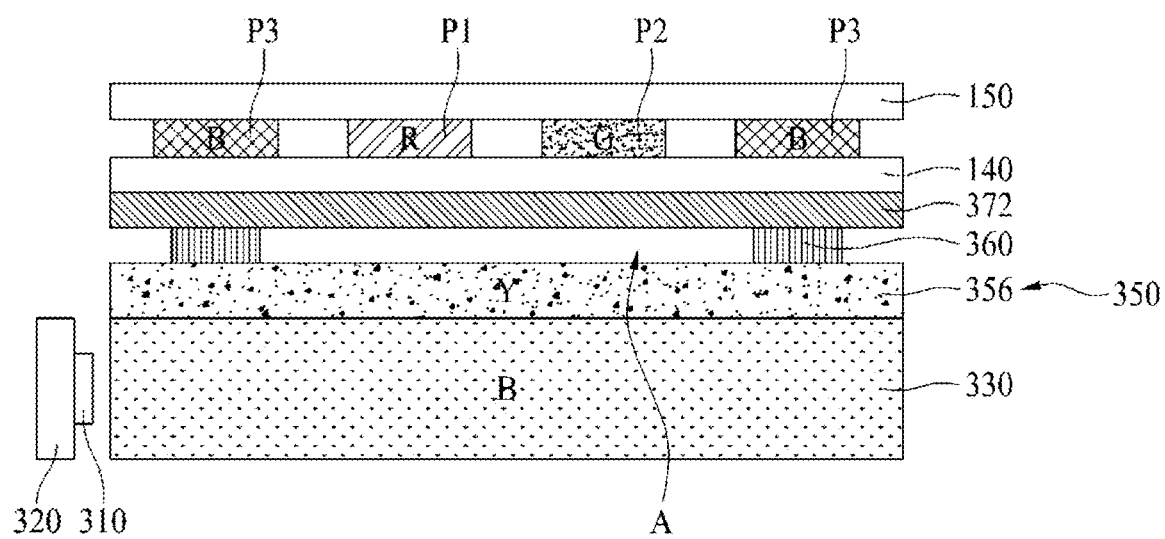
FIG. 11 is a schematic cross-sectional view showing a color conversion layer and an adhesive layer according to a seventh embodiment of the present disclosure.

FIG. 11 is a schematic cross-sectional view illustrating a seventh embodiment of the color conversion layer and the adhesive layer.

Referring to FIG. 11, a liquid crystal display device includes the display panel 100 and the backlight unit 300.

The backlight unit 300 includes the light sources 310, the light guide plate 330, a yellow color conversion layer 356, the adhesive layer 360, and the prism sheet 372.

The light sources 310 may include a blue LED which emits blue light. The light sources 310 are arranged on at least one side surface of the light guide plate 330 and emit light toward the side surface of the light guide plate 330.

The light guide plate 330 converts light emitted from the light sources 310 into a surface light source and emits light toward the display panel 100. In the seventh embodiment of the present disclosure, on the light guide plate 330, the blue light may be incident from the blue LED. Accordingly, the light guide plate 330 allows the blue light to proceed toward the display panel 100.

The color conversion layer 350 is disposed between the light guide plate 330 and the display panel 100 and includes the yellow color conversion layer 356. The yellow color conversion layer 356 is formed on the light guide plate 330 to overlap a plurality of pixels P1, P2, and P3. The yellow color conversion layer 356 is disposed on a path of light which proceeds toward the display panel 100 from the light guide plate 330 and converts the blue light emitted by the light guide plate 330 into white light. In more detail, the yellow color conversion layer 356 includes a yellow light emitting material. The yellow light emitting material included in the yellow color conversion layer 356 collides with a part of the blue light and absorbs energy of the blue light. Accordingly, a wavelength of the part of the blue light is changed into that of yellow light, and blue light and yellow light which have passed through the yellow color conversion layer 356 are mixed with each other and converted into white light.

The above-described yellow light emitting material includes, for example, a yellow phosphorescent material or a yellow fluorescent material and is mixed with a transparent resin material, such as a silicone resin, to form the yellow color conversion layer 356.

The prism sheet 372 condenses the white light, which is incident thereon, in a first direction. Here, the first direction may correspond to a major axis direction or a minor axis direction of the light guide plate 330.

The adhesive layer 360 is disposed between the yellow color conversion layer 356 and the prism sheet 372. The adhesive layer 360 is formed on a part of a top surface of the yellow color conversion layer 356 so as to allow the prism sheet 372 to adhere to the yellow color conversion layer 356 simultaneously while forming an air gap A between the yellow color conversion layer 356 and the prism sheet 372. Here, the adhesive layer 360 is formed to not overlap a G pixel P2 and an R pixel P1 such that the yellow light generated by the yellow color conversion layer 356 proceeds toward the G pixel P2 and the R pixel P1 without luminance reduction. That is, the adhesive layer 360 is formed to overlap a B pixel P3 as shown in FIG. 11.

The display panel 100 includes the lower polarizing plate 140, the upper polarizing plate 150, and a plurality of such pixels P1, P2, and P3.

The lower polarizing plate 140 is disposed at a bottom surface of the lower substrate 110 and transmits light as linear polarized light. The upper polarizing plate 150 is disposed on a top surface of the upper substrate 120 such that transmission axes of the upper polarizing plate 150 and the lower polarizing plate 140 intersect or cross each other. The upper polarizing plate 150 transmits light as linear polarized light.

The plurality of pixels P1, P2, and P3 are formed between the lower substrate 110 and the upper substrate 120 and include the R pixel P1 which includes a red color filter, the G pixel P2 which includes a green color filter, and the B pixel P3 which includes a blue color filter.

In the R pixel P1, as the white light generated by the yellow color conversion layer 356 passes through the red color filter, blue light and green light are absorbed and red light is emitted. In the G pixel P2, as the white light generated by the yellow color conversion layer 356 passes through the green color filter, blue light and red light are absorbed and green light is emitted. In the B pixel P3, as the white light generated by the yellow color conversion layer 356 passes through the blue color filter, red light and green light are absorbed and blue light is emitted.

In the liquid crystal display device according to the seventh embodiment of the present disclosure, blue light is emitted by the light sources 310, and yellow light is generated by the yellow color conversion layer 356. That is, the liquid crystal display device may prevent a red light emitting material from absorbing green light by generating yellow light using the yellow light emitting material. Accordingly, in the liquid crystal display device according to the seventh embodiment of the present disclosure, the green light increases and a half width of a green peak increases, as shown in FIG. 12, such that luminance of light may be expected to increase.

Also, the liquid crystal display device according to the seventh embodiment of the present disclosure may prevent a light-condensing function of the prism sheet 372 from being degraded due to a scattering property caused by the yellow light emitting material of the yellow color conversion layer 356 by forming the air gap A between the yellow color conversion layer 356 and the prism sheet 372.

In addition, although it is assumed in FIG. 11 that the liquid crystal display device includes an edge light type backlight unit, the present disclosure is not limited thereto. In other embodiments, a liquid crystal display device may include a direct light type backlight unit. In this case, light sources of the liquid crystal display device may be arranged below a yellow color conversion layer.

Figure 13A:
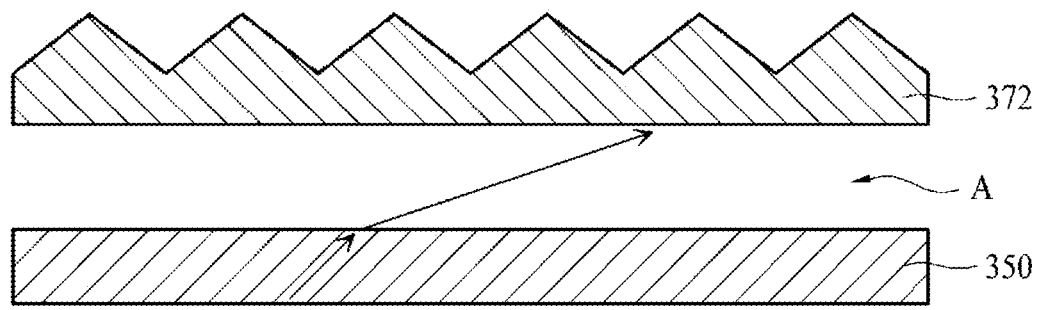
FIGS. 13A and 13B are views illustrating refraction of light depending on whether an air gap is present.
Figure 13B:
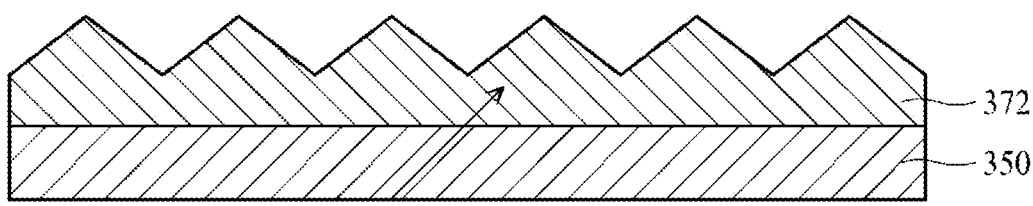
Figure 14A:
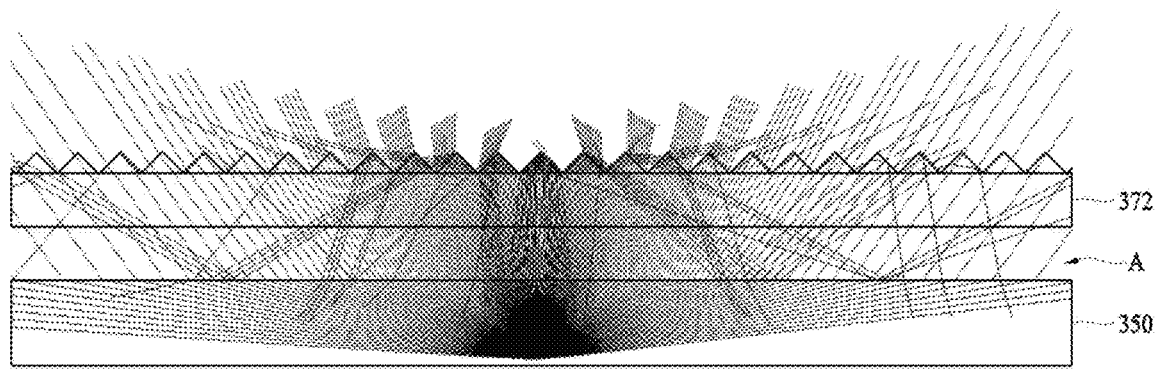
FIGS. 14A and 14B are views illustrating an optical path depending on whether an air gap is present.
Figure 14B:
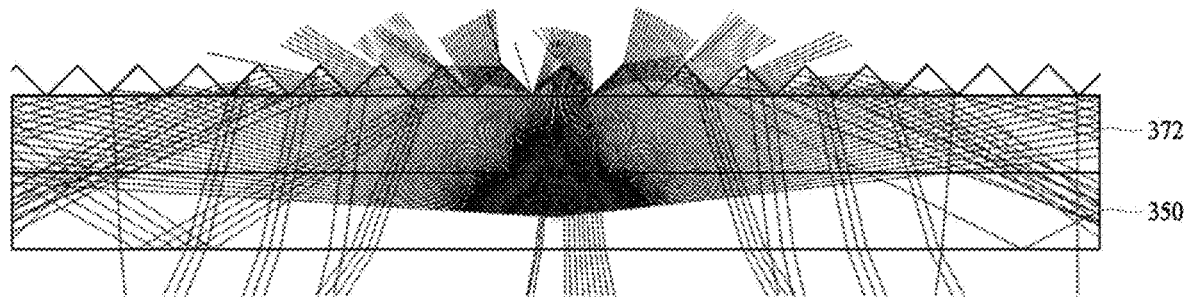

FIGS. 13A and 13B are views illustrating refraction of light depending on whether an air gap is present, and FIGS. 14A and 14B are views illustrating an optical path depending on whether an air gap is present.

FIG. 13A illustrates refraction of light when an air gap A is present between the color conversion layer 350 and the prism sheet 372. The light emitted by the color conversion layer 350 is refracted at a boundary between the color conversion layer 350 and the air gap A according to Snell's law. Accordingly, light which is incident on the prism sheet 372 from the air gap A has less light with a beam spread angle of 90 degrees than that of in a case when the air gap A is not present.

FIG. 13B illustrates refraction of light when the air gap A is not present between the color conversion layer 350 and the prism sheet 372. Since the light emitted by the color conversion layer 350 is output by a light emitting material in a full range, more light is emitted with the light with the beam spread angle of 90 degrees than the case in which the air gap A is present.

Due to the above-described difference, brightness of light in a case when the air gap A is present between the color conversion layer 350 and the prism sheet 372 differs from that in a case when the air gap A is not present therebetween.

Referring to FIG. 14A, it may be seen that when the air gap A is present between the color conversion layer 350 and the prism sheet 372, less light, which is incident on the prism sheet 372 at an angle of 90 degrees and totally reflected, is emitted and most light is emitted toward the display panel.

On the other hand, referring to FIG. 14B, it may be seen that when the air gap A is not present between the color conversion layer 350 and the prism sheet 372, more light, which is incident on the prism sheet 372 at an angle of 90 degrees and totally reflected, is emitted and most light fails to be emitted toward the display panel and is incident on the color conversion layer 350 again.

Figures 15, 16:
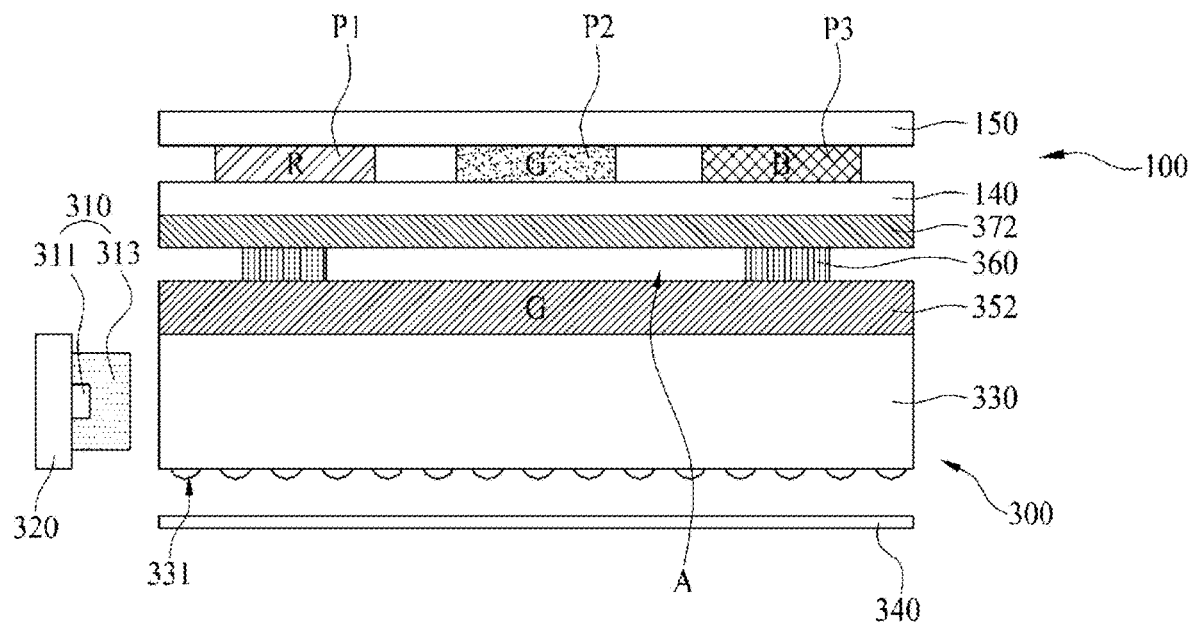
FIG. 15 is a view illustrating a difference in luminance depending on whether an air gap is present.
FIG. 16 is a schematic cross-sectional view showing a color conversion layer and an adhesive layer according to an eighth embodiment of the present disclosure.

As a result, according to the embodiment of the present disclosure, as the air gap A is formed between the color conversion layer 350 and the prism sheet 372, in comparison to a configuration in which the color conversion layer 350 and the prism sheet 372 are simply attached to each other without the air gap A therebetween, light increases such that luminance may be improved as shown in FIG. 15.

Eighth Embodiment

FIG. 16 is a schematic cross-sectional view illustrating an eighth embodiment of the color conversion layer and the adhesive layer.

Referring to FIG. 16, a liquid crystal display device includes the display panel 100 and the backlight unit 300.

Here, the display panel 100 may include one of a liquid crystal display (LCD) device, a plasma display panel (PDP), a field emission display (FED), an electroluminescence display (ELD), and an organic LED (OLED). An LCD typically does not have its own light emitting element and has an additional light source.

Accordingly, the backlight unit 300 which includes a light source on a rear surface is provided and emits light toward a front surface of the display panel 100 formed of an LCD such that a recognizable image is embodied therethrough.

Although not shown in the drawing, in detail, the display panel 100 formed of an LCD includes the upper and lower substrates 110 and 120 (refer to FIG. 4) and a liquid crystal layer interposed between the two substrates 110 and 120. The backlight unit 300 is provided therebehind.

Here, the lower substrate 110 includes a plurality of gate lines which are formed on an inside of the lower substrate 110 to be spaced at certain intervals apart in parallel and data lines which overlap with the gate lines to form pixel areas. A TFT is formed at each of intersections of pixels P1, P2, and P3 where the gate lines and the data line overlap each other. In each pixel area, a plurality of pixel electrodes are connected to the TFT through drain contact holes and include a transparent conductive material.

The TFT includes a gate electrode, a gate insulator film, a semiconductor layer, and source and drain electrodes.

Here, the pixel electrode includes a plurality of bars separated and spaced apart in each of the pixels P1, P2, and P3. Also, a common line is formed to be flush with the gate line, and a plurality of common electrodes, which are electrically connected to the common line and alternately spaced apart from the plurality of pixel electrodes separated in the pixels P1, P2, and P3, are formed.

Here, as another example, the pixel electrode may have a plate shape and be formed for each of the pixels P1, P2, and P3. Here, a part of the pixel electrode may be configured to overlap the gate line so as to form a storage capacitor.

Also, when the plurality of pixel electrodes and the common electrodes are formed to be spaced apart in each of the pixels P1, P2, and P3, the lower substrate 110, which operates in an IPS mode, is formed. When the pixel electrode having a plate shape is formed on the lower substrate 110 without the common electrode, the lower substrate 110 which operates in any one of a TN mode, an ECB mode, and a VA mode is formed.

Also, an inner surface of the upper substrate 120, which faces the lower substrate 110, includes color filters having colors, for example, R, G, and B corresponding to the pixels P1, P2, and P3 and a black matrix which surrounds each of them and hides non-display elements such as the gate line, the data line, the TFT, and the like.

That is, there are included an R pixel P1 which includes a red color filter, a G pixel P2 which includes a green color filter, and a B pixel P3 which includes a blue color filter.

Here, the red color filter includes red color which transmits light having a red wavelength and absorbs light having other wavelengths. Also, the green color filter includes green color which transmits light having a green wavelength and absorbs light having other wavelengths. The blue color filter includes blue color which transmits light having a blue wavelength and absorbs light having other wavelengths.

The upper polarizing plate 150 is attached to the upper substrate 120 of the display panel 100, and the lower polarizing plate 140 is attached to the lower substrate 110. A light transmission axis of the upper polarizing plate 150 intersects with, or crosses a light transmission axis of the lower polarizing plate 140. Also, an alignment film for setting a pre-tilt angle of liquid crystals may be formed on inner surfaces of the upper substrate 120 and the lower substrate 110 that are in contact with the liquid crystals.

Also, the backlight unit 300 which supplies light to the display panel 100 is provided such that the backlight unit 300 refracts light of a light source which is emitted from one surface behind the lower substrate 110 toward the light guide plate 330 to allow the light to be incident on the display panel 100.

The backlight unit 300 includes the light sources 310 formed of a plurality of light emitting diodes (hereinafter, referred to as LEDs), the light guide plate 330, the green color conversion layer 352, the adhesive layer 360, the prism sheet 372, and the reflection sheet 340.

Here, in the liquid crystal display device according to the eighth embodiment of the present disclosure, the light guide plate 330 of the backlight unit 300 may be formed of a glass material (hereinafter, referred to as a glass light guide plate) and may include micro patterns 331 which include poly (methyl methacrylate) (PMMA) diffusion beads 333 (refer to FIG. 18) and which are formed on a bottom surface 330d (refer to FIG. 18) of the glass light guide plate 330.

That is, among components of the backlight unit 300, the light guide plate 330 is generally manufactured using a light-transmitting plastic material such as PMMA, a methyl styrene (MS) resin, poly styrene (PS), poly propylene (PP), polyethylene terephthalate (PET), and polycarbonate (PC). Typically, a light guide plate formed of a PMMA material is used.

However, such plastic light guide plates have high light transmittance but should have a certain thickness or more for maintaining certain strength and the like and have a high heat expansion rate and a high humidity swelling property.

Accordingly, display devices, in which a light guide plate formed of plastic such as PMMA, PC, PS, and the like is used, have disadvantages such as a limitation in decreasing in a thickness, a limitation in arrangement of the light guide plate and a light source portion, and utilization of an additional support structure, and the like.

To overcome the disadvantages of plastic light guide plates, in the eighth embodiment of the present disclosure, the glass light guide plate 330 formed of a glass material is used as a light guide plate 330 used in the backlight unit 300.

Since the glass light guide plate 330 has excellent hardness in comparison to a plastic light guide plate so as to decrease a thickness thereof, there are advantages, such as decreasing a thickness of the display device well and having a low heat expansion property and a low humidity swelling property.

Figure 17:
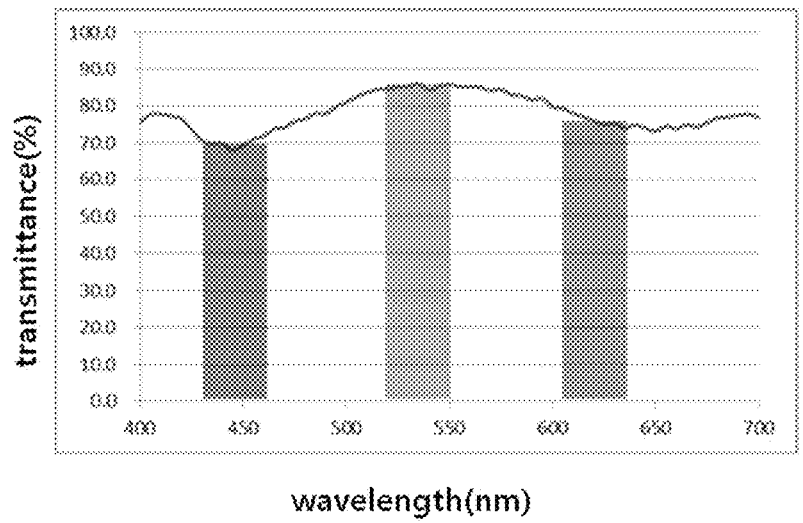
FIG. 17 is a graph illustrating transmittance according to a wavelength of a glass light guide plate.

In addition, referring to FIG. 17, the glass light guide plate 330 has a difference in transmittance depending on a wavelength of light which is incident on an inside of the glass light guide plate 330. It may be seen that wavelengths corresponding to red and blue in the light, which is incident on the inside of the glass light guide plate 330, have lower transmittance than that of a wavelength corresponding to green.

Here, when transmittance of a wavelength is low, the glass light guide plate 330 absorbs and dissipates the corresponding wavelength.

When the glass light guide plate 330 which has a difference in transmittance for each wavelength of light is used as a component of the backlight unit 300, a greenish phenomenon appears at an opposing light entrance portion which is opposite to one edge on which the light source 310 is located such that poor definition is caused by such a color deviation.

Accordingly, in the liquid crystal display device according to the eighth embodiment of the present disclosure, the patterns 331, which include the PMMA diffusion beads 333, may be formed on the bottom surface 330d of the glass light guide plate 330.

The PMMA diffusion beads 333 decrease a path of light, which is incident on the inside of the glass light guide plate 330, so as to minimize light absorption or dissipation caused by the glass light guide plate 330. Through this, it is possible to minimize occurrence of a color deviation caused by the difference in transmittance for each wavelength in the glass light guide plate 330.

It will be described below in detail.

Also, magenta light, in which blue light and red light are mixed, is allowed to be incident on the inside of the glass light guide plate 330, and the green color conversion layer 352 is located above the glass light guide plate 330 such that a color deviation caused by the difference in transmittance for each wavelength in the glass light guide plate 330 may be minimized.

In more detail, a plurality of LEDs 310, which are light sources, are mounted on the LED PCB 320 and form an LED assembly. The LED assembly allows light which exits from the LED 310 to face a light entrance surface 330a (refer to FIG. 18) of the glass light guide plate 330.

Here, each of the LEDs 310, which are light sources, is formed of a magenta LED which includes a blue LED chip 311, which emits blue light, and a red fluorescent body 313, which is applied to a top of the blue LED chip 311. The blue light which is emitted by the blue LED chip 311 is mixed with red light emitted by the red fluorescent body 313 such that magenta light exits outward.

Accordingly, magenta light emitted from each of the LEDs 310 is incident on the light entrance surface 330a of the light guide plate 330, is refracted therein toward the display panel 100, is treated as a uniform high-quality white surface light source while passing through the green color conversion layer 352 and the prism sheet 372 with light reflected by the reflection sheet 340, and is supplied to the display panel 100.

Here, the green color conversion layer 352 is formed on the glass light guide plate 330 to overlap a plurality of pixels P1, P2, and P3. The green color conversion layer 352 is disposed on a path of light which proceeds toward the display panel 100 from the glass light guide plate 330 and converts the magenta light emitted by the glass light guide plate 330 into white light.

In more detail, the green color conversion layer 352 includes a green light emitting material. The green light emitting material included in the green color conversion layer 352 collides with a part of the blue light included in the magenta light and absorbs energy of the blue light. Accordingly, a wavelength of the part of the blue light is changed into that of green light, and blue light, red light and green light which have passed through the green color conversion layer 352 are mixed with each other and converted into white light.

The above-described green light emitting material includes, for example, a green phosphorescent material or a green fluorescent material and is mixed with a transparent resin material, such as a silicone resin, to form the green color conversion layer 352.

Accordingly, in the liquid crystal display device according to the eighth embodiment of the present disclosure, in the R pixel P1, as the white light generated by the green color conversion layer 352 passes through the red color filter, blue light and green light are absorbed and red light is emitted.

Also, in the G pixel P2, as the white light generated by the green color conversion layer 352 passes through the green color filter, the blue light and red light are absorbed and the green light is emitted. In the B pixel P3, as the white light generated by the green color conversion layer 352 passes through the blue color filter, red light and green light are absorbed and blue light is emitted.

In the liquid crystal display device according to the present disclosure, only the magenta light is emitted by the light sources 310 and the green light is generated by the green color conversion layer 352. That is, since the red light and the green light are spatially separated and the red light is generated first and then the green light is generated, the liquid crystal display device prevents a red light emitting material from absorbing the green light.

Accordingly, in the liquid crystal display device according to the present disclosure, the green light increases and a half width of a green peak increases, as shown in FIG. 12, such that luminance of light may be expected to increase.

Also, as described above, in the liquid crystal display device according to the eighth embodiment of the present disclosure, since magenta light is allowed to be incident on the inside of the glass light guide plate 330 such that green light which has high transmittance is not incident on the inside of the glass light guide plate 330, it is possible to prevent the greenish phenomenon from occurring at the opposing light entrance portion due to the difference in transmittance for each wavelength in the glass light guide plate 330.

That is, since the liquid crystal display device according to the eighth embodiment of the present disclosure includes the patterns 331 which include the PMMA diffusion beads 333 and which are formed on the bottom surface 330d of the glass light guide plate 330, allows the magenta light to be incident on the inside of the glass light guide plate 330, and includes the green color conversion layer 352 located above the glass light guide plate 330, the magenta light, which is incident on the inside of the glass light guide plate 330, uniformly spreads inside the glass light guide plate 330 without a loss of light so as to embody a uniform high-luminance surface light source and green light and red light are spatially separated from each other so as to embody high luminance.

Through this, it is possible to embody a thin liquid crystal display device in comparison to a liquid crystal display device including a plastic light guide plate. Also, while the glass light guide plate 330, which has advantages of low heat expansion and low humidity swelling, is used, a color deviation caused by the difference in transmittance for each wavelength in the glass light guide plate 330 may be minimized.

The prism sheet 372 located above the green color conversion layer 352 condenses light, which is incident thereon, in a first direction. Here, the first direction may correspond to a major axis direction or a minor axis direction of the glass light guide plate 330.

The adhesive layer 360 is disposed between the green color conversion layer 352 and the prism sheet 372.

The adhesive layer 360 is formed on a portion of a top surface of the green color conversion layer 352 so as to allow the prism sheet 372 to adhere to the green color conversion layer 352 simultaneously while an air gap A is being formed between the green color conversion layer 352 and the prism sheet 372.

Here, the adhesive layer 360 is formed to not overlap the G pixel P2 such that the green light generated by the green color conversion layer 352 proceeds toward the G pixel P2 without luminance reduction. That is, the adhesive layer 360 is formed to overlap the R pixel P1 and the B pixel P3.

As described above, the air gap A is formed between the green color conversion layer 352 and the prism sheet 372 such that a light-condensing function of the prism sheet 372 may be prevented from being degraded due to a scattering property caused by the green light emitting material of the green color conversion layer 352.

That is, brightness of light in a case when the air gap A is present between the green color conversion layer 352 and the prism sheet 372 differs from that in a case when the air gap A is not present therebetween. When the air gap A is present between the green color conversion layer 352 and the prism sheet 372, less light, which is incident on the prism sheet 372 at an angle of 90 degrees and totally reflected, is emitted and most light is emitted toward the display panel.

On the other hand, when the air gap A is not present between the green color conversion layer 352 and the prism sheet 372, more light, which is incident on the prism sheet 372 at an angle of 90 degrees and totally reflected, is emitted and most light fails to be emitted toward the display panel and is incident on the green color conversion layer 352 again.

In other words, it may be seen that when the air gap A is formed between the green color conversion layer 352 and the prism sheet 372, in comparison to a configuration in which the green color conversion layer 352 and the prism sheet 372 are simply attached to each other without the air gap A therebetween, a quantity of light increases such that luminance may be improved.

As described above, since the backlight unit 300 of the liquid crystal display device according to the eighth embodiment of the present disclosure includes the patterns 331 which include the PMMA diffusion beads 333 and which are formed on the bottom surface 330*d* of the glass light guide plate 330, allows the magenta light to be incident on the inside of the glass light guide plate 330, and includes the green color conversion layer 352 located above the glass light guide plate 330, the magenta light, which is incident on the inside of the glass light guide plate 330, uniformly spreads inside the glass light guide plate 330 without a loss of light so as to embody a uniform high-luminance surface light source and green light and red light are spatially separated from each other so as to embody high luminance.

Through this, it is possible to embody a thin liquid crystal display device in comparison to a liquid crystal display device including a plastic light guide plate. Also, while the glass light guide plate 330, which has advantages of low heat expansion and low humidity swelling, is used, a color deviation caused by the difference in transmittance for each wavelength in the glass light guide plate 330 may be minimized.

Also, since the air gap A is formed between the green color conversion layer 352 and the prism sheet 372, it is possible to prevent a light-condensing function of the prism sheet 372 from being degraded due to a scattering property caused by a green light emitting material of the green color conversion layer 352, so as to further increase the luminance.

Figure 18:
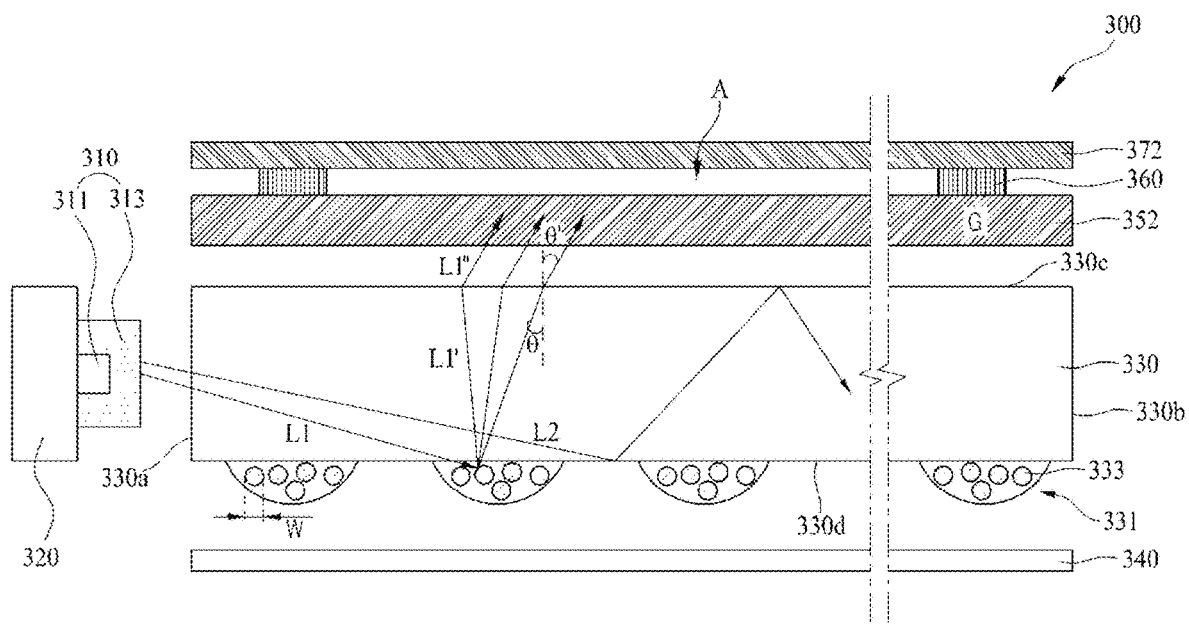
FIG. 18 is a schematic cross-sectional view illustrating a backlight unit according to the eighth embodiment of the present disclosure.

FIG. 18 is a schematic cross-sectional view illustrating the backlight unit according to the eighth embodiment of the present disclosure for describing a light dispersion effect according to a light guide pattern.

As shown in the drawing, the backlight unit 300 of the liquid crystal display device according to the eighth embodiment of the present disclosure includes the white or silver reflection sheet 340, the light sources 310 arranged along a longitudinal direction of one edge of the reflection sheet 340, the glass light guide plate 330 mounted on the reflection sheet 340, and the green color conversion layer 352 and the prism sheet 372 which are located above the glass light guide plate 330.

Here, the air gap A is formed between the green color conversion layer 352 and the prism sheet 372 by the adhesive layer 360.

The light source 310 is located on one side of the light guide plate 330 to face the light entrance surface 330*a* of the light guide plate 330. The light source includes the plurality of LEDs 310 and the PCB 320 on which the plurality of LEDs 310 are mounted while being spaced at certain intervals apart.

Here, the plurality of LEDs 310 are formed of magenta LEDs which include the blue LED chip 311 which has excellent light emitting efficiency and luminance and which include the red fluorescent body 313 applied above the blue LED chip 311.

That is, blue light emitted from the blue LED chip 311 is mixed with red light emitted by the red fluorescent body 313 located above the blue LED chip 311 such that magenta light exits from the LED 310. The magenta light, which exits from the LED 310, is incident on the inside of the glass light guide plate 330 through the light entrance surface 330*a* of the glass light guide plate 330.

In the glass light guide plate 330, on which the magenta light which exits from each of the plurality of LEDs 310 is incident, the light incident thereon from the LED 310 proceeds inside the glass light guide plate 330 due to several instances of total reflection and is evenly spread in a wide area of the glass light guide plate 330 such that a surface light source is provided to the display panel 100 (refer to FIG. 16).

The glass light guide plate 330 formed of a glass material as described above includes the light entrance surface 330*a* corresponding to the LED 310, the opposing light entrance surface 330*b* corresponding and opposite to the light entrance surface 330*a*, a top surface 330*c* which connects the light entrance surface 330*a* to the opposing light entrance surface 330*b*, the bottom surface 330*d* which faces the reflection sheet 340, and both side surfaces (not shown).

Also, the glass light guide plate 330 includes the patterns 331 having a particular shape and formed on the bottom surface 330*d* to supply a uniform surface light source. Particularly, since the patterns 331 included in the glass light guide plate 330 according to the eighth embodiment of the present disclosure include the PMMA diffusion beads 333, the uniform surface light source may be embodied, and occurrence of a color deviation caused by the difference in transmittance for each wavelength in the glass light guide plate 330 may also be prevented.

In more detail, since the liquid crystal display device according to the eighth embodiment of the present disclosure allows the LEDs 310 which are light sources to emit magenta light such that the magenta light is incident on the inside of the glass light guide plate 330, it is possible to minimize the occurrence of a color deviation caused by the difference in transmittance for each wavelength in the glass light guide plate 330.

That is, the liquid crystal display device according to the eighth embodiment of the present disclosure prevents green light which has higher transmittance than that of red light and blue light from being incident on the inside of the glass light guide plate 330 so as to minimize occurrence of the greenish phenomenon at the opposing light entrance surface such that the occurrence of a color deviation may be minimized.

Also, a plurality of such patterns 331 are provided on the bottom surface 330d of the glass light guide plate 330. The patterns 331 have a hemispherical shape and protrude from the bottom surface 330d. The plurality of hemispherical patterns 331 are distributed and arranged on the bottom surface 330d of the glass light guide plate 330 in an embossed shape to be spaced at certain intervals apart.

In one embodiment, each of the hemispherical patterns 331 have a diameter of several hundred μm (e.g., greater than 100 μm). In one embodiment, the hemispherical patterns 331 are formed by a printing method or an imprinting method. In one embodiment, the light guide plate 330 and the micro patterns 331 are made of the same material. In one embodiment, the micro patterns 331 are arranged in an array including a plurality of rows and columns.

An ink which is used for forming the hemispherical patterns 331 may be referred to as an ink compound for patterning. The ink compound for patterning may include an acrylic copolymer having a (meth)acrylate group for forming a print film simultaneously while improving an adhesive property to the glass light guide plate 330, the PMMA diffusion beads 333 capable of scattering (diffusing) light, a solvent for adjusting viscosity of an ink and adjusting silkscreen workability, and the like at a certain weight %.

That is, the backlight unit 300 of the liquid crystal display device according to the eighth embodiment of the present disclosure includes the hemispherical patterns 331 including the PMMA diffusion beads 333 on the bottom surface 330d of the glass light guide plate 330.

The patterns 331 provided on the bottom surface 330d of the glass light guide plate 330 scatter or refract a part of light which is transmitted from the light source 310 and which is totally reflected inside the glass light guide plate 330 to allow the light to not be totally reflected and exit outward from the glass light guide plate 330.

That is, a part L1 of magenta light from the LEDs 310 is incident on the hemispherical patterns 331 formed of the ink compound and is diffused by the PMMA diffusion beads 333 included in the hemispherical patterns 331.

A part L1' of the light diffused by the PMMA diffusion beads 333 moves toward the top surface 330c of the glass light guide plate 330. Here, light, which is incident on the top surface 330c of the glass light guide plate 330 at an incident angle θ of 42 degrees or less based on a normal line of the glass light guide plate 330, is not totally reflected into the glass light guide plate 330 and exits (L1") outward from the glass light guide plate 330 at an exit angle greater than the incident angle to be incident on the display panel 100 (refer to FIG. 18).

As described above, since the part L1 of the magenta light, which is incident on the inside of the glass light guide plate 330, is not totally reflected and directly exits outward from the glass light guide plate 330 through the PMMA diffusion beads 333 such that absorption and dissipation of the magenta light, which is incident on the inside of the glass light guide plate 330, may be minimized by the property of the glass light guide plate 330, a color deviation does not occur and a surface light source having high luminance may be supplied to the display panel 100.

Meanwhile, light L2 of the light from the LED 310 which does not move toward the hemispherical patterns 331 is totally reflected by the bottom surface 330d of the glass light guide plate 330 and proceeds inside the glass light guide plate 330.

Here, the PMMA diffusion beads 333 included in the hemispherical patterns 331 may each have a diameter W of about 7.5 to 12 μm.

As the diameter W of the PMMA diffusion beads 333 becomes smaller, an optical path of light which is totally reflected inside the glass light guide plate 330 increases. When the optical path of the light which is totally reflected inside the glass light guide plate 330 increases, an absorption rate of light having color which has high transmittance increases due to the difference in transmittance for each wavelength which is characteristics of the glass light guide plate 330.

That is, when the diameter W of the PMMA diffusion beads 333 is 5 μm or less, since the optical path of the light which is totally reflected inside the glass light guide plate 330 increases such that the absorption rate of light according to a wavelength thereof increases, a color deviation is caused.

Also, when the diameter W of the PMMA diffusion beads 333 is 12 μm or more, diffusion performance of the glass light guide plate 330 is high due to the PMMA diffusion beads 333 such that overall luminance of the liquid crystal display device decreases. Also, coating performance in which an ink including the PMMA diffusion beads 333 is adsorbed onto the glass light guide plate 330 is also low such that reliability of the patterns 331 may decrease.

Accordingly, in accordance with the eighth embodiment of the present disclosure, the PMMA diffusion beads 333 included in the hemispherical patterns 331 have the diameter w of 7.5 to 12 μm such that high luminance may be embodied while occurrence of a color deviation may be minimized. The coating reliability of the patterns 331 may be provided even while the PMMA diffusion beads 333 included in the hemispherical patterns 331 are not visually recognized.

Table 1 shows an experimental result of measuring a color deviation of the liquid crystal display device according to the eighth embodiment of the present disclosure by using a color temperature.

TABLE 1

| Correlated Color Temperature (CCT) | Sample 1 | Sample 2 | Sample 3 |
|---|---|---|---|
| Opposing Light Entrance Portion | 8830K | 9330K | 11530K |
| Central Portion | 11730K | 10920K | 11818K |
| Light Entrance Portion | 15510K | 11960K | 11438K |
| Difference between Color Temperatures (Light Entrance Portion - Opposing Light Entrance Portion) | 6680 | 2630 | 92 |

Sample 1 shows a color deviation of a general liquid crystal display device including a glass light guide plate as a color temperature; Sample 2 shows a color deviation of a liquid crystal display device including patterns including PMMA diffusion beads on a bottom surface of a glass light guide as a color temperature; and Sample 3 shows a color deviation of the liquid crystal display device according to the eighth embodiment of the present disclosure in which the patterns 331 including the PMMA diffusion beads 333 are provided on the bottom surface 330d of the glass light guide plate 330, magenta light is allowed to be incident on the inside of the glass light guide plate 330, and the green color conversion layer 352 is located above the glass light guide plate 330 as a color temperature.

Here, in all of Sample 1, Sample 2, and Sample 3, 65" liquid crystal display devices are measured. In Sample 2 and Sample 3, the PMMA diffusion beads 333 included in the patterns 331 provided on the bottom surface 330d of the glass light guide plate 330 have the diameter W of 7.5 μm.

Also, a color temperature expresses chromaticity of a light source or reference white as a temperature of the closest area on a radial curve instead of coordinates on a two-dimensional chromatic chart and is referred to as a correlated color temperature (CCT).

The color temperature is used as a numerical value which indicates a degree of expressing to which color white is closest. When white is closest to blue in color expression of a display device, a color temperature is measured as high. When white is closest to yellow, a color temperature is measured as low.

As the color temperature becomes higher, a high-quality color is expressed.

Referring to Table 1, in Sample 1, a color temperature of an opposing light entrance portion is 8830 K. The color temperature is close to green. Accordingly, in Sample 1, a greenish phenomenon occurs at the opposing light entrance portion.

In Sample 1, since a difference between color temperatures of a light entrance portion and the opposing light entrance portion is 6680, this means that a color deviation occurs between the light entrance portion and the opposing light entrance portion. That is, it means that a high color deviation occurs between the light entrance portion and the opposing light entrance portion in the liquid crystal display device including the glass light guide plate.

On the other hand, in Sample 2, since a difference between color temperatures of a light entrance portion and an opposing light entrance portion is 2630, it may be seen that the difference between the color temperatures of the light entrance portion and the opposing light entrance portion decreases by 4050 in comparison to Sample 1.

Through this, it may be seen that a color deviation of a liquid crystal display device may be reduced by including patterns including PMMA diffusion beads on a bottom surface of a glass light guide plate.

Particularly, in Sample 3, it may be seen that a difference between color temperatures of a light entrance portion and an opposing light entrance portion hardly occurs. Also, it may be seen that the difference between the color temperatures of the light entrance portion and the opposing light entrance portion decreases by 6588 in comparison to Sample 1.

In other words, it may be seen that although the glass light guide plate 330 is used, the liquid crystal display device according to the eighth embodiment of the present disclosure includes the patterns 331 including the PMMA diffusion beads 333 on the bottom surface 330d of the glass light guide plate 330, allows magenta light and suppresses other color lights to be incident on the inside of the glass light guide plate 330, and disposes the green color conversion layer 352 in a location above the glass light guide plate 330 such that it is possible to minimize occurrence of the difference between the color temperatures, that is, a color deviation between the light entrance portion and the opposing light entrance portion.

Particularly, in Sample 3, it may be seen that the difference between the color temperatures of the light entrance portion and the opposing light entrance portion decreases by 2538 in comparison to Sample 2. Through this, it may be seen that a configuration, in which the patterns 331 including the PMMA diffusion beads 333 are provided on the bottom surface 330d of the glass light guide plate 330, in which magenta light is allowed to be incident on the inside of the glass light guide plate 330, and in which the green color conversion layer 352 is located above the glass light guide plate 330, may minimize a color deviation further than a configuration in which the patterns 331 including the PMMA diffusion beads 333 are provided on the bottom surface 330d of the glass light guide plate 330.

As described above, since the backlight unit 300 of the liquid crystal display device according to the eighth embodiment of the present disclosure includes the patterns 331 which include the PMMA diffusion beads 333 and which are formed on the bottom surface 330d of the glass light guide plate 330, allows the magenta light to be incident on the inside of the glass light guide plate 330, and includes the green color conversion layer 352 located above the glass light guide plate 330, the magenta light, which is incident on the inside of the glass light guide plate 330, uniformly spreads inside the glass light guide plate 330 without a loss of light so as to embody a uniform high-luminance surface light source and green light and red light are spatially separated from each other so as to embody high luminance.

Through this, it is possible to embody a thin liquid crystal display device in comparison to a liquid crystal display device including a plastic light guide plate. Also, while the glass light guide plate 330, which has advantages of low heat expansion and low humidity swelling, is used, a color deviation caused by the difference in transmittance for each wavelength in the glass light guide plate 330 may be minimized.

Also, since the air gap A is formed between the green color conversion layer 352 and the prism sheet 372, it is possible to prevent a light-condensing function of the prism sheet 372 from being degraded due to a scattering property caused by a green light emitting material of the green color conversion layer 352, so as to further increase the luminance.

As described above, according to the embodiments of the present disclosure, since a green color conversion layer which converts blue light into green light is additionally included, red color light and green color light may be spatially separated such that it is possible to prevent a red light emitting material from absorbing the green light as much as an area in which a green light emitting area overlaps a red color absorption area. As a result, according to the embodiments, the green light increases such that luminance and color reproduction may be improved.

According to the embodiments, an air gap is formed between a color conversion layer and a prism sheet such that light which is perpendicularly incident on the prism sheet may be reduced. Accordingly, light which is incident on the prism sheet may be prevented from being totally reflected, and luminance may be increased by emitting most light toward a display panel.

According to the embodiments, since an adhesive layer is formed to not overlap a green pixel, the green light may be incident on the display panel without a loss such that light efficiency may be increased.

Also, since patterns including PMMA diffusion beads are provided on a bottom surface of a glass light guide plate, magenta light is allowed to be incident on an inside of the glass light guide plate, and a green color conversion layer is located above the glass light guide plate, the magenta light, which is incident on the inside of the glass light guide plate, uniformly spreads inside the glass light guide plate without a loss of light and embodies a uniform high-luminance surface light source. Also, green light and red light are spatially separated from each other such that high luminance may be embodied.

Through this, it is possible to embody a thin liquid crystal display device in comparison to a liquid crystal display device including a plastic light guide plate. Also, while the glass light guide plate, which has advantages of low heat expansion and low humidity swelling, is used, a color deviation caused by the difference in transmittance for each wavelength in the glass light guide plate may be minimized.

Although the embodiments of the present disclosure have been described above in more detail with reference to the attached drawings, the present disclosure is not limited to the above embodiments and a variety of modifications thereof may be made without departing from the technical concept of the present disclosure.

Accordingly, the embodiments disclosed herein are not intended to limit but explain the technical concept of the present disclosure, and the scope of the present disclosure should not be limited by the above embodiments.

Therefore, the above-described embodiments should be understood to be exemplary and not limiting in every aspect.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A liquid crystal display device, comprising:
a display panel including a red pixel, a green pixel, and a blue pixel; and
a backlight unit configured to emit light to the display panel, the backlight unit including:
a light source configured to output a first color light;
a glass light guide plate having a first surface and a second surface opposite to the first surface, the first surface facing the display panel, the second surface including patterned components that include a diffusion material, the glass light guide plate being formed of a glass material, and each of the patterned components having a hemispherical shape;
a color conversion layer contacting the first surface of the light guide plate, the color conversion layer configured to convert the first color light into a second color light such that red light and green light are spatially separated;
an optical sheet configured to diffuse the second color light; and
an adhesive layer between the color conversion layer and the optical sheet, the adhesive layer overlapping the blue pixel and not overlapping the green pixel.

2. The liquid crystal display device of claim 1, wherein the first color light includes blue light, and the second color light includes the green light.

3. The liquid crystal display device of claim 2, wherein the first color light further includes the red light, and the color conversion layer includes a green color conversion layer configured to convert a part of the blue light into the green light.

4. The liquid crystal display device of claim 3, wherein the green color conversion layer overlaps the green pixel.

5. The liquid crystal display device of claim 1, wherein the diffusion material includes polymethyl methacrylate (PMMA) diffusion beads.

6. The liquid crystal display device of claim 5, wherein each of the PMMA diffusion beads has a diameter of 7 to 12 µm.

7. The liquid crystal display device of claim 1, wherein each of the patterned components a diameter greater than 100 µm, and the patterned components are spaced from each other.

8. The liquid crystal display device of claim 1, further comprising:
a reflection sheet located below the glass light guide plate and facing the bottom surface.

9. The liquid crystal display device of claim 1, further comprising:
an air gap formed between the color conversion layer and the optical sheet.

10. The liquid crystal display device of claim 1, wherein the red pixel, the green pixel, and the blue pixel are spaced from the color conversion layer by the optical sheet.

11. The liquid crystal display device of claim 1, wherein the first color light is magenta light, and the entire color conversion layer is a green color conversion layer.

12. A display device, comprising:
a light source configured to output a first color light;
a glass light guide plate emitting the first color light toward a display pane, the glass light guide plate having a first surface facing the display panel and a second surface opposite to the first surface, the second surface including patterned components that include a diffusion material, the glass light guide plate being formed of a glass material, and each of the patterned components having a hemispherical shape;
a color conversion layer configured to convert the first color light into a second color light such that red light and green light are spatially separated, the first color light including blue light, the second color light including green light; and
an optical sheet configured to diffuse the second color light;
an adhesive layer between the color conversion layer and the optical sheet; and
a red pixel, a green pixel, and a blue pixel that are spaced from the color conversion layer by the optical sheet,
wherein the adhesive layer overlaps the blue pixel and does not overlap the green pixel.

13. The display device of claim 12, wherein the color conversion layer includes a mixed color conversion layer, the mixed color conversion layer includes a red light emitting material and a green light emitting material, the red light emitting material is configured to convert the blue light into the red light, and the green light emitting material is configured to convert the blue light into the green light.

14. The display device of claim 12, wherein the color conversion layer includes:
- a red color conversion layer configured to convert a part of the blue light into the red light; and
- a green color conversion layer flush with the red color conversion layer, the green color conversion layer configured to convert another part of the blue light into the green light.

15. The display device of claim 12, wherein the first color light further includes the red light, and the color conversion layer includes a green color conversion layer configured to convert a part of the blue light into the green light.

\* \* \* \* \*